United States Patent
Solovyev et al.

(10) Patent No.: US 12,047,609 B2
(45) Date of Patent: Jul. 23, 2024

(54) INTERPOLATION FILTER FOR AN INTER PREDICTION APPARATUS AND METHOD FOR VIDEO CODING

(71) Applicant: HUAWEI TECHNOLOGIES CO., LTD., Guangdong (CN)

(72) Inventors: Timofey Mikhailovich Solovyev, Moscow (RU); Maxim Borisovitch Sychev, Moscow (RU); Huanbang Chen, Shenzhen (CN); Alexander Alexandrovich Karabutov, Moscow (RU); Roman Igorevich Chernyak, Moscow (RU); Sergey Yurievich Ikonin, Moscow (RU); Haitao Yang, Shenzhen (CN); Elena Alexandrovna Alshina, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 164 days.

(21) Appl. No.: 17/707,202

(22) Filed: Mar. 29, 2022

(65) Prior Publication Data
US 2022/0248062 A1 Aug. 4, 2022

Related U.S. Application Data

(63) Continuation of application No. PCT/RU2020/050256, filed on Sep. 30, 2020.
(Continued)

(51) Int. Cl.
*H04N 19/82* (2014.01)
*H04N 19/105* (2014.01)
(Continued)

(52) U.S. Cl.
CPC ........... *H04N 19/80* (2014.11); *H04N 19/105* (2014.11); *H04N 19/109* (2014.11);
(Continued)

(58) Field of Classification Search
CPC .... H04N 19/80; H04N 19/105; H04N 19/109; H04N 19/117; H04N 19/132;
(Continued)

(56) References Cited

U.S. PATENT DOCUMENTS

2003/0202607 A1 10/2003 Srinivasan
2018/0054622 A1 2/2018 Bossen
2021/0099729 A1* 4/2021 Rusanovskyy ........ H04N 19/70

FOREIGN PATENT DOCUMENTS

CN 107925772 A 4/2018
WO 2018028559 A1 2/2018
(Continued)

OTHER PUBLICATIONS

Gary J. Sullivan et al, Overview of the High Efficiency Video Coding (HEVC) Standard, IEEE Transactions on Circuits and Systems for Video Technology, vol. 22, No. 12, Dec. 2012, total 20 pages.
(Continued)

*Primary Examiner* — Patrick E Demosky
(74) *Attorney, Agent, or Firm* — WOMBLE BOND DICKINSON (US) LLP

(57) ABSTRACT

An apparatus for inter prediction of a sample value of a current full-integer pixel of a plurality of pixels associated with a current block of a current frame of a video signal is disclosed. The apparatus is configured to: determine a motion vector of the current full-integer pixel based on a motion compensation model; determine for the current full-integer pixel a corresponding sub-integer pixel in a reference frame; determine positions of a set of corresponding filter
(Continued)

support pixels in the reference frame; obtain a respective sample value of the corresponding sub-integer pixel of the current full-integer pixel and the corresponding filter support pixels in the reference frame by applying a bilinear interpolation; and determine the inter predicted sample value of the current full-integer pixel.

15 Claims, 13 Drawing Sheets

Related U.S. Application Data

(60) Provisional application No. 62/908,591, filed on Sep. 30, 2019.

(51) Int. Cl.

| | | |
|---|---|---|
| *H04N 19/109* | (2014.01) | |
| *H04N 19/117* | (2014.01) | |
| *H04N 19/132* | (2014.01) | |
| *H04N 19/139* | (2014.01) | |
| *H04N 19/176* | (2014.01) | |
| *H04N 19/182* | (2014.01) | |
| *H04N 19/196* | (2014.01) | |
| *H04N 19/52* | (2014.01) | |
| *H04N 19/80* | (2014.01) | |

(52) U.S. Cl.
CPC ......... *H04N 19/117* (2014.11); *H04N 19/132* (2014.11); *H04N 19/139* (2014.11); *H04N 19/176* (2014.11); *H04N 19/182* (2014.11); *H04N 19/197* (2014.11); *H04N 19/52* (2014.11)

(58) Field of Classification Search
CPC .. H04N 19/139; H04N 19/176; H04N 19/182; H04N 19/197; H04N 19/52; H04N 19/82
See application file for complete search history.

(56) References Cited

FOREIGN PATENT DOCUMENTS

| WO | 2018166357 A1 | 9/2018 | |
|---|---|---|---|
| WO | 2019072372 A1 | 4/2019 | |
| WO | WO-2019072372 A1 * | 4/2019 | ........... H04N 19/513 |
| WO | 2019093916 A1 | 5/2019 | |
| WO | 2019110120 A1 | 6/2019 | |

OTHER PUBLICATIONS

ITU-T H.265(Apr. 2013), Series H: Audiovisual and Multimedia Systems, Infrastructure of audiovisual services—Coding of moving video, High efficiency video coding, total 317 pages.
ITU-T H.264(Jun. 2019), Series H: Audiovisual and Multimedia Systems, Infrastructure of audiovisual services—Coding of moving video, Advanced video coding for generic audiovisual services, total 836 pages.
ITU-T H.265(Jun. 2019), Series H: Audiovisual and Multimedia Systems, Infrastructure of audiovisual services—Coding of moving video, High efficiency video coding, total 696 pages.
Video et al.,"Text of ISO/IEC CD 23094-1, Essential Video Coding",Jul. 22, 2019,total:292pages.
Yao Dong et al., "Sub-pixel interpolation of MPEG-4 motion compensation and its hardware implementation",Nov. 2005,total:5pages.
Semih Esenlik et al., "Non-CE9: Reducing bi-linear interpolation buffer requirement for DMVR",oint Video Experts Team (JVET) of ITU-T SG 16 WP 3 and ISO/IEC JTC 1/SC 29/WG 11,14th Meeting: Geneva, CH, Mar. 19 27, 2019,JVET-N0179-v3,total:4pages.
Huanbang Chen Haitao Yang Maxim Sychev Timofey Solovyev Jianle Chen, CE4: Affine inter prediction (Test 1.5) [online], JVET-K0185-v3, ITU-T Internet URL:http://phenix.it-sudparis.eu/jvet/doc_end_user/documents/11_Ljubljana/wg11/JVET-K0185-v3.zip>, Jul. 13, 2018, pp. 1-3.

* cited by examiner

700

| fractional offset | c0 | c1 | c2 | c3 |
|---|---|---|---|---|
| 0 | 0 | 64 | 0 | 0 |
| 1 | -8 | 77 | -5 | 0 |
| 2 | -7 | 74 | -2 | -1 |
| 3 | -7 | 72 | 0 | -1 |
| 4 | -7 | 69 | 3 | -1 |
| 5 | -7 | 66 | 6 | -1 |
| 6 | -6 | 63 | 9 | -2 |
| 7 | -6 | 61 | 11 | -2 |
| 8 | -6 | 58 | 14 | -2 |
| 9 | -6 | 55 | 17 | -2 |
| 10 | -6 | 52 | 20 | -2 |
| 11 | -5 | 50 | 22 | -3 |
| 12 | -5 | 47 | 25 | -3 |
| 13 | -5 | 44 | 28 | -3 |
| 14 | -4 | 42 | 30 | -4 |
| 15 | -4 | 39 | 33 | -4 |
| 16 | -4 | 36 | 36 | -4 |
| 17 | -4 | 33 | 39 | -4 |
| 18 | -4 | 30 | 42 | -4 |
| 19 | -3 | 28 | 44 | -5 |
| 20 | -3 | 25 | 47 | -5 |
| 21 | -3 | 22 | 50 | -5 |
| 22 | -2 | 20 | 52 | -6 |
| 23 | -2 | 17 | 55 | -6 |
| 24 | -2 | 14 | 58 | -6 |
| 25 | -2 | 11 | 61 | -6 |
| 26 | -2 | 9 | 63 | -6 |
| 27 | -1 | 6 | 66 | -7 |
| 28 | -1 | 3 | 69 | -7 |
| 29 | -1 | 0 | 72 | -7 |
| 30 | -1 | -2 | 75 | -8 |
| 31 | 0 | -5 | 77 | -8 |

INTERPOLATION FILTER FOR AN INTER PREDICTION APPARATUS AND METHOD FOR VIDEO CODING

CROSS-REFERENCE TO RELATED APPLICATION

This application is a continuation of International Application No. PCT/RU2020/050256, filed on Sep. 30, 2020, which claims priority of U.S. Provisional Application No. 62/908,591, filed on Sep. 30, 2019. The disclosures of the aforementioned applications are hereby incorporated by reference in their entirety.

TECHNICAL FIELD

Generally, the present application relates to the field of video coding. More specifically, the present application relates to an interpolation filter for an inter prediction apparatus and method for video coding as well as an encoding apparatus and a decoding apparatus comprising such an inter prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason, support of video coding standards is a mandatory requirement for almost any video compression application.

The state-of-the-art video coding standards are based on partitioning of a source frame or picture into frame or picture blocks. Processing of these blocks depend on their size, spatial position and a coding mode specified by an encoder. Coding modes can be classified into two groups according to the type of prediction: intra- and inter-prediction modes. Intra-prediction modes use pixels of the same frame (also referred to as picture or image) to generate reference samples to calculate the prediction values for the pixels of the block being reconstructed. Intra-prediction is also referred to as spatial prediction. Inter-prediction modes are designed for temporal prediction and uses reference samples of previous or next frames to predict pixels of the block of the current frame. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source frame into frame blocks in the form of so-called coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress.

Sub-integer pixel interpolation techniques have been developed in order to improve the prediction accuracy for a level of compression that can be achieved for inter prediction. In this case, the predictive data generated during motion compensation, which is used to code a video block, may correspond to sub-integer pixels, whose values may be interpolated from values for full pixels of video blocks of a reference video frame or other coded unit to which a motion vector refers. The video encoder may calculate values for sub-integer pixel positions using interpolation techniques, e.g., by applying interpolation filters to a set of support pixels, e.g., values for full integer pixels and/or previously coded values of other sub-integer pixel positions.

Today's standards H.264/AVC and H.265/HEVC are based on a ¼ pel displacement resolution. The Joint Video Exploration Team (JVET) group is exploring post-HEVC video compression technologies, including non-translational motion compensation models, such as affine transforms. In order to estimate and compensate the fractional-pel (or sub-integer) displacements, the full-integer pixels of the reference image has to be interpolated on the fractional-pel, i.e. sub-integer positions. To get the interpolated image on the fractional-pel positions interpolation filters are used. The problem of interpolation for non-translation motion models is the variable fractional-pel displacements.

The quality of the interpolated image strongly depends on the properties of the interpolation filter(s). Short-tap filters (e.g. bilinear) may suppress high frequencies and make interpolated picture blurred. On the other hand, long-tap filters (e.g. sinc-based) require more memory bandwidth and may preserve high frequencies but generate some ringing artifacts in the vicinity of sharp edges. Another consideration is that for motion compensation of non-translational models the complexity has been reduced by decreasing of accuracy of interpolation and prediction.

In the proposed JEM affine motion model there are two types of motion supported: zoom and rotation. Most of the fractional-pel positions are non-constant within a prediction unit. Pixels are replaced by sub-blocks to speed up the interpolation. Within one sub-block the displacement vector is constant and translational. The complexity was reduced gradually but accuracy was reduced as well. To improve the quality of prediction the precision of motion compensation was improved by increasing the precision of motion vector displacement for sub-blocks with increasing of amount of interpolation filters. Current accuracy of interpolation filtering for non-translational motion model still requires to be improved.

Thus, there is a need for an improved interpolation filter for an inter prediction apparatus and method for video coding providing an improved video coding efficiency.

SUMMARY

It is an object of the application to provide an improved interpolation filter for an inter prediction apparatus and method for video coding providing an improved video coding efficiency.

The foregoing and other objects are achieved by the subject matter of the independent claims. Further implementation forms are apparent from the dependent claims, the description and the figures.

According to one embodiment, an apparatus for inter prediction of a sample value of a current full-integer pixel of a plurality of pixels of a current block of a current frame of a video signal is provided. The apparatus comprises a processing unit configured to: determine a motion vector of the current full-integer pixel on the basis of the current frame and a reference frame of the video signal and/or a motion compensation model; determine for the current full-integer pixel a corresponding sub-integer pixel in the reference frame on the basis of the motion vector of the current full-integer pixel; generate on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel; determine a respective sample value, in particular luminance value, of the corresponding sub-integer pixel of the current full-integer pixel and the corresponding filter support pixels in the reference frame; and determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

Thus, an improved inter prediction apparatus is provided allowing improving the efficiency for video coding.

In aspect further embodiment, the predefined set of filter support pixels in the current frame comprises one or more vertically and/or horizontally neighboring half-integer pixels of the current full-integer pixel in the current frame.

In one embodiment, the predefined set of filter support pixels in the current frame comprises one or more vertically and/or horizontally neighboring full-integer pixels of the current full-integer pixel in the current frame.

It may also be provided that the spatial high-pass filter is a 5-tap filter or a 3-tap filer. In an implementation form, the 5-tap filter or the 3-tap filter is a symmetric filter, i.e. a filter where the first and the fifth filter coefficients (or, in the case of the 3-tap filter, the first and the third filter coefficients) are identical and the second and the fourth filter coefficients are identical. In an implementation form, the first and the fifth filter coefficients are negative, while the other filter coefficients of the 5-tap filter are positive.

In one embodiment, the predefined set of filter support pixels in the current frame comprises one or more neighboring full-integer pixels and half-integer pixels of the current full-integer pixel and the 5-tap filter has the following filter coefficients (−6, 9, 26, 9, −6), which can be normalized by the factor $\frac{1}{32}$.

In one embodiment, the predefined set of filter support pixels in the current frame comprises one or more neighboring full-integer pixels and half-integer pixels of the current full-integer pixel and the 5-tap filter has the following filter coefficients (−1, 0, 10, 0, −1), which can be normalized by the factor $\frac{1}{8}$. As will be appreciated, in a further embodiment without the intermediate half-integer support pixels, this filter becomes a 3-tap filter with the coefficients (−1, 10, −1).

In aspect further embodiment, the processing unit of the apparatus is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame.

In may be provided that the processing unit of the apparatus is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel.

In one embodiment, the processing unit of the apparatus is configured to determine a respective motion vector of each of the sub-integer pixels of the filter support pixels in the current frame by determining a mean vector of the motion vector of the current full-integer pixel and one or more motion vectors of neighboring full-integer pixels of the current full-integer pixel.

In a further embodiment, the processing unit of the apparatus is further configured to determine the one or more motion vectors of neighboring full-integer pixels of the current full-integer pixel on the basis of the current frame and the reference frame of the video signal and/or a motion compensation model.

In can be provided that, the processing unit of the apparatus is configured to determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame, in case the motion vector of the current full-integer pixel is determined on the basis of a non-translational motion compensation model, and to determine the inter predicted sample value of the current pixel in the current frame on the basis of a conventional scheme, such as the conventional scheme defined in H.264/AVC and H.265/HEVC, in case the motion vector of the current full-integer pixel is determined on the basis of a translational motion compensation model.

In one embodiment, the non-translational motion compensation model is an affine, warping and/or panoramic motion compensation model.

In one embodiment, a method for inter prediction of a sample value of a current full-integer pixel of a plurality of pixels of a current block of a current frame of a video signal is provided. The method comprises: determining a motion vector of the current full-integer pixel on the basis of the current frame and a reference frame of the video signal and/or on the basis of a motion compensation model;

determining for the current full-integer pixel a corresponding sub-integer pixel in the reference frame on the basis of the motion vector of the current full-integer pixel; generating on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel; determining a respective sample value, in particular luminance value, of the corresponding sub-integer pixel of the current full-integer pixel and the corresponding filter support pixels in the reference frame; and determining the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

Thus, an improved inter prediction method is provided allowing improving the efficiency for video coding.

The method according to the above embodiment can be performed by the inter prediction apparatus according to the embodiments mentioned above. Further features of the inter prediction method according to the above embodiment result directly from the functionality of the inter prediction apparatus according to the above embodiment and its different implementation forms described above and below.

According to one embodiment, an encoding apparatus for encoding a current frame of a video signal is provided, wherein the encoding apparatus comprises an inter prediction apparatus according to one of the above embodiments.

According to a further embodiment, a decoding apparatus for decoding a current reconstructed frame of a compressed video signal is provided, wherein the decoding apparatus comprises an inter prediction apparatus according to one of the above embodiments.

According to a further embodiment, a computer program product comprising program code for performing the method according to the above embodiments when executed on a computer or a processor is provided.

Embodiments described herein provide in particular the following advantages. At least some embodiments allow performing interpolation with pixel-wise accuracy while keeping the complexity at a low level. At least some embodiments may support any kind of non-translational movements. Some embodiments may allow removing blocking artefacts across sub-blocks edges. Some embodiments may reduce memory bandwidth. Further, some embodiments can reduce memory requirements for storing a set of filter coefficients. Some embodiments can allow reusing well optimized HW bilinear transform. Some further embodiments may align orientation of filtering along transformation. At least some embodiments allow reducing ringing artifacts caused by long motion interpolation filter while improving quality of interpolated edges. Further embodiments may allow increasing subjective quality of edges in reconstructed pictures. Moreover, some embodiments may not require any additional signaling and, thus, can seamlessly replace existing interpolation methods for non-translational movements. Splitting the interpolation into two steps allows separating the fractional offset compensation from the high-pass filtering.

According to one embodiment, an apparatus for inter prediction of a sample value of a current full-integer pixel of a plurality of pixels associated with a current block of a current frame of a video signal is provided, wherein the apparatus comprises:

a memory containing instructions; and
a processor in communication with the memory and upon execution of the instructions, configured to:
determine a motion vector of the current full-integer pixel on the basis of a motion compensation model;
determine for the current full-integer pixel a corresponding sub-integer pixel in a reference frame on the basis of the motion vector of the current full-integer pixel;
determine, on the basis of positions of a predefined set of filter support pixels in the current frame, positions of a set of corresponding filter support pixels in the reference frame, wherein the predefined set of filter support pixels in the current frame comprises one or more neighboring full-integer pixels and/or sub-integer pixels of the current full-integer pixel;
obtain a respective sample value (L) of the corresponding sub-integer pixel of the current full-integer pixel and the corresponding filter support pixels in the reference frame by applying a bilinear interpolation that corresponds to a bilinear interpolation in Decoder Side Motion Vector Refinement, DMVR; and
determine the inter predicted sample value of the current full-integer pixel by applying a spatial high-pass filter to the sample value of the corresponding sub-integer pixel of the current full-integer pixel in the reference frame and to the sample values of the corresponding filter support pixels in the reference frame.

In the context of the above and other embodiments, the term "pixel" (as used for example in the term "full-integer pixel" and "sub-integer pixel") may be considered and interpreted broadly as specifying any amount of information at a specific position within an array, like a matrix. Generally, the term "pixel" may be understood as "sample". This also holds for terms being a combination with the term "pixel", like the term "full-integer pixel". This may be understood as "full-integer sample" alike. Thus, the term "pixel" is not to be construed as necessarily referring to pixels of a display. Rather, in the description that follows and the embodiments disclosed herein, this term is to be interpreted as a portion of information, for example a number or a value or the like, at a specific position within a frame. Sub-integer pixel in contrast with the full-integer pixel can usually not be obtained directly from the current frame buffer or the reference frame buffer. In the context of this application, the term sub-integer pixel corresponds to some position between the full-integer pixels and corresponding values at these positions. To obtain a value of the sub-integer pixel specific procedure—interpolation will usually be necessary. The interpolation can, in some examples, be a bilinear interpolation or interpolation performed by 4- or 8-tap DCT-based interpolation filters, i.e. a discrete cosine transform interpolation filter.

In the context of the embodiments mentioned herein, the term "associated with a current block" is to be understood as referring to pixels that are related to the current block. This is considered to encompass the pixels that are within the block, but may also encompass pixels that are at the border or outside the border of the current block. In an embodiment, the pixel outside of the block but immediately adjacent to the border of the block may be considered as being "associated with" the current block.

The bilinear interpolation in decoder side motion vector refinement, DMVR, may be specific implementation of bilinear interpolation applied in the DMVR that is used in the Essential Video Coding standard, EVC.

That the bilinear interpolation "corresponds to" DMVR is to be understood as meaning that, in terms of mathematical functions and/or software modules and/or coding, a bilinear interpolation is used that has similarities to DMVR. In an embodiment, the same equations as in DMVR may be used for the bilinear interpolation. However, that the bilinear interpolation corresponds to DMVR is not to be construed as requiring that the same input as in DMVR is provided to the bilinear interpolation.

With the above method, modules for bilinear interpolation from other video coding software can be reused in the inter prediction of a sample value. This reduces the memory and/or chip area utilization and can make encoding using potentially also different methods more efficient.

In one embodiment, the same bilinear interpolation implementation as in DMVR is used. This embodiment pertains to using the same equations as in DMVR. This may also pertain to the actual coding of this bilinear interpolation. This may further add to the advantage of reduced memory and/or chip area utilization as potentially complete reuse of DMVR modules is achieved.

In one embodiment, the sample value (L) of the corresponding sub-integer pixel of the current full-integer pixel in the reference frame is determined on the basis of the following equation:

$$A = (L0*T[fdX][0] + L1*T[fdX][1] + \text{offset0}) >> \text{shift0}$$

$$B = (L2*T[fdX][0] + L3*T[fdX][1] + \text{offset0}) >> \text{shift0}$$

$$L = (A*T[fdY][0] + B*T[fdY][1] + \text{offset1}) >> \text{shift1}$$

where a table T is a predefined table with size N×2 where N is the number of fractional positions and values shift0, shift1, offset0, offset1 are derived based on sample bitdepth and the table T.

The table T may be a table of interpolation filter coefficients. The above equations correspond to DMVR, making reuse of DMVR modules in the current method possible and thereby reducing the memory and/or chip area utilization.

It can be provided that the table T has two columns T[0] and T[1] and T[1]=64-T[0] and the number of lines of the table corresponds to a number of fractional sample positions. Again, the table may be an interpolation filter coefficients table. This structure of table is also used in DMVR, making again the reuse of information available from DVMR possible and reducing the memory required.

In an embodiment, it can be provided that the table T comprises N=16 fractional sample positions and the table T is given by:

| Fractional position p | T[0] | T[1] |
|---|---|---|
| 0 | 64 | 0 |
| 1 | 60 | 4 |
| 2 | 56 | 8 |
| 3 | 52 | 12 |
| 4 | 48 | 16 |
| 5 | 44 | 20 |
| 6 | 40 | 24 |
| 7 | 36 | 28 |
| 8 | 32 | 32 |
| 9 | 28 | 36 |
| 10 | 24 | 40 |
| 11 | 20 | 44 |
| 12 | 16 | 48 |
| 13 | 12 | 52 |
| 14 | 8 | 56 |
| 15 | 4 | 60 |

This table is identical to the table used in DMVR, which reduces the amount of memory required even further.

In an alternative embodiment, the table T comprises N=32 fractional sample positions and the table is given by:

| Fractional sample position p | interpolation filter coefficients T[ p ][ 0 ] | T[ p ][ 1 ] |
|---|---|---|
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |
| 28 | 8 | 56 |
| 29 | 6 | 58 |
| 30 | 4 | 60 |
| 31 | 2 | 62 |

This table differs from what is used in DMVR as 32 fractional positions are provided. This provides improved sample prediction in the computer-implemented method, thereby improving the accuracy of the prediction.

In one embodiment, the shift0=bitDepth-8, offset0=0, shift1=12-shift0, offset1=1<<(shift1−1). These values used in the above equations result in improved prediction. They may also increase the efficiency of software and hardware implementation due to intermediate results A and B fit in 16-bit at least for the most important application scenario with bitDepth equal to 10.

It can be provided that the sample bitdepth is 10, shift0=2, offset0=0, shift1=10, offset1=1<<9. This further advantageously supports the prediction accuracy.

In one embodiment, the processor is further configured to use, as an input for the inter prediction of the sample value of the current full-integer pixel, the following entities:
  a location (xCb, yCb) of the current block in full sample units
  two variables cbWidth and cbHeight specifying a width and a height of the current block
  a horizontal change of the motion vector, dX
  a vertical change of the motion vector, dY
  a motion vector, mvBaseScaled
  one or more selected reference picture sample arrays, refPicLX
  one or more sample bit depth, bitDepth
  a width of the frame in samples, pic_width
  a height of the frame in samples, pic_height
  an array obtained from (cbWidth)×(cbHeight), called (cbWidth)×(cbHeight) array predSamplesLX of prediction sample values.

These inputs can be used to provide a reliable prediction of the sample values of the current full-integer pixel, thereby supporting the prediction.

In one embodiment, the variables A and B are obtained by $$A=(\text{refPicLX}[x\text{Int}][y\text{Int}]*T[x\text{Frac}][0]+\text{refPicLX}[x\text{Int}+1][y\text{Int}]*T[x\text{Frac}][1]+\text{offset0})>>\text{shift0}$$

$$B=(\text{refPicLX}[x\text{Int}][y\text{Int}+1]*T[x\text{Frac}][0]+\text{refPicLX}[x\text{Int}+1][y\text{Int}+1]*T[x\text{Frac}][1]+\text{offset0})>>\text{shift0},$$

Wherein $$mvX[0]=(\text{mvBaseScaled}[0]+dX[0]*x+dY[0]*y)$$

$$mvX[1]=(\text{mvBaseScaled}[1]+dX[1]*x+dY[1]*y)$$

$$x\text{Int}=xCb+(mvX[0]>>9)+x$$

$$y\text{Int}=yCb+(mvX[1]>>9)+y$$

$$x\text{Frac}=(mvX[0]>>4)\&31$$

$$y\text{Frac}=(mvX[1]>>4)\&31$$

and wherein the locations xInt and yInt in the selected reference picture sample arrays, refPicLX[xInt][yInt], is given by $$x\text{Int}=\text{Clip3}(0,\text{pic\_width}-1,x\text{Int})$$

$$y\text{Int}=\text{Clip3}(0,\text{pic\_height}-1,y\text{Int}).$$

Implementing the calculation of the values A and B in this way results in an increased computational efficiency of the prediction.

It may be provided that the predefined set of filter support pixels in the current frame comprises one or more vertically and/or horizontally neighbouring half-integer pixels of the current full-integer pixel in the current frame. The more neighbouring pixels are used, the better the prediction result is.

In one embodiment, the predefined set of filter support pixels in the current frame comprises one or more vertically and/or horizontally neighbouring full-integer pixels of the current full-integer pixel in the current frame.

It can further be provided that the spatial high-pass filter is a 5-tap or a 3-tap filter. These filter support the reliable prediction of the sample values.

In one embodiment, the predefined set of filter support pixels in the current frame comprises one or more neighbouring full-integer pixels and half-integer pixels of the current full-integer pixel and wherein the 5-tap filter has the following filter coefficients (−6, 9, 26, 9, −6).

In one embodiment, the predefined set of filter support pixels in the current frame comprises one or more neighboring full-integer pixels and/or half-integer pixels of the current full-integer pixel and wherein the 5-tap filter has the filter coefficients (−1, 0, 10, 0, −1) or the 3-tap filter has the filter coefficients (−1, 10, −1).

It may further be provided that the processing unit of the apparatus is configured to determine the respective sample values of the corresponding sub-integer pixel of the current full-integer pixel in the reference frame and of the corresponding filter support pixels in the reference frame on the basis of a bilinear interpolation of the respective neighbouring full-integer pixels in the reference frame. Using bilinear interpolation also for this calculation of the sample values of the sub-integer pixel may further support accuracy of the prediction.

It can be provided that the processing unit of the apparatus is further configured to determine a respective motion vector of each of the sub-integer pixels of the filter support pixels in the current frame on the basis of the motion vector of the current full-integer pixel and one or more motion vectors of neighbouring full-integer pixels of the current full-integer pixel. This can improve prediction accuracy further.

In one embodiment, the processing unit of the apparatus is configured to determine a respective motion vector of each of the sub-integer pixels of the filter support pixels in the current frame by determining a mean vector of the motion vector of the current full-integer pixel and one or more motion vectors of neighbouring full-integer pixels of the current full-integer pixel. Using such mean vector can make further calculations computationally more efficient.

In a further embodiment the processing unit of the apparatus is further configured to determine the one or more motion vectors of neighbouring full-integer pixels of the current full-integer pixel on the basis of a motion compensation model. This can, for example, include a translational or non-translational motion compensation model.

In a further embodiment, the processing unit of the apparatus is configured to determine the inter predicted sample value of the current full-integer pixel by applying a spatial high-pass filter to the sample value of the corresponding sub-integer pixel of the current full-integer pixel in the reference frame and to the sample values of the corresponding filter support pixels in the reference frame, in case the motion vector of the current full-integer pixel is determined on the basis of a non-translational motion compensation model, and to determine the inter predicted sample value of the current full-integer pixel on the basis of a conventional scheme, in case the motion vector of the current full-integer pixel is determined on the basis of a translational motion compensation model. Non-translational models may perform better with respect to the computing resources required in the prediction, thereby increasing the efficiency of the prediction.

In an embodiment, the non-translational motion compensation model may be an affine, warping and/or panoramic motion compensation model.

It can also be provided that the processing unit is configured to construct the set of separable 4-tap filters constructed as a convolution of a bilinear filter and a following high-pass filter.

In one embodiment, the processing unit is configured to apply an intermediate rounding operation in the filtering process. This may comprise a right-shifting of values and may, thereby, reduce the number of bits involved in calculations and may thereby increase the computational efficiency of the prediction.

In one embodiment, a method for inter prediction of a sample value of a current full-integer pixel of a plurality of pixels associated with a current block of a current frame of a video signal is provided, wherein the method comprises:
determining (601) a motion vector of the current full-integer pixel on the basis of a motion compensation model;
determining (603) for the current full-integer pixel a corresponding sub-integer pixel in the reference frame on the basis of the motion vector of the current full-integer pixel;
determining (605) on the basis of positions of a predefined set of filter support pixels in the current frame, positions of a set of corresponding filter support pixels in the reference frame, wherein the predefined set of filter support pixels in the current frame comprises one or more neighboring full-integer and/or sub-integer pixels of the current full-integer pixel;

obtaining (607) a respective sample value of the corresponding sub-integer pixel of the current full-integer pixel and the corresponding filter support pixels in the reference frame by applying a bilinear interpolation that corresponds to a bilinear interpolation in Decoder Side Motion Vector Refinement, DMVR; and determining (609) the inter predicted sample value of the current full-integer pixel by applying a spatial high-pass filter to the sample value of the corresponding sub-integer pixel of the current full-integer pixel in the reference frame and to the sample values of the corresponding filter support pixels in the reference frame.

This method allows for reusing already existing modules, like DMVR modules. In an embodiment, if the DMVR corresponds to the one used in EVC, the respective modules may be reused also in the current interpolation, reducing the memory requirements.

In one embodiment, the same bilinear interpolation implementation as in DMVR is used. This allows for directly applying modules used in DMVR in the current interpolation, reducing the amount of memory required even further.

It may be provided that the sample value (L) of the corresponding sub-integer pixel of the current full-integer pixel in the reference frame is determined on the basis of the following equation:

$$A=(L0*T[fdX][0]+L1*T[fdX][1]+\text{offset0})>>\text{shift0}$$

$$B=(L2*T[fdX][0]+L3*T[fdX][1]+\text{offset0})>>\text{shift0}$$

$$L=(A*T[fdY][0]+B*T[fdY][1]+\text{offset1})>>\text{shift1}$$

where a table T is a predefined table with size N×2 where N is the number of fractional positions and values shift0, shift1, offset0, offset1 are derived based on sample bitdepth and the table T;

and wherein the sample bitdepth is 10, shift0=2, offset0=0, shift1=10, offset1=1<<9.

These calculations perform computationally efficient, increasing the efficiency of the prediction.

In one embodiment, the table T has two columns T[0] and T[1] and T[1]=64-T[0] and the number of lines of the table corresponds to a number of fractional sample positions. The table may be an interpolation filter coefficient table. Corresponding tables are used in DMVR, making the reuse of bilinear interpolation corresponding to DMVR more efficient.

More specifically, the table T may comprise N=16 fractional sample positions and the table T is given by:

| Fractional position p | T[0] | T[1] |
|---|---|---|
| 0 | 64 | 0 |
| 1 | 60 | 4 |
| 2 | 56 | 8 |
| 3 | 52 | 12 |
| 4 | 48 | 16 |
| 5 | 44 | 20 |
| 6 | 40 | 24 |
| 7 | 36 | 28 |
| 8 | 32 | 32 |
| 9 | 28 | 36 |
| 10 | 24 | 40 |
| 11 | 20 | 44 |
| 12 | 16 | 48 |
| 13 | 12 | 52 |
| 14 | 8 | 56 |
| 15 | 4 | 60 |

This table is identical to the table used in DMVR, whereby the reuse of the DMVR is provided even more efficient with respect to the computational complexity involved.

In one embodiment, the table T comprises N=32 fractional sample positions and the table is given by:

| Fractional sample position p | interpolation filter coefficients T[ p ][ 0 ] | T[ p ][ 1 ] |
|---|---|---|
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |
| 28 | 8 | 56 |
| 29 | 6 | 58 |
| 30 | 4 | 60 |
| 31 | 2 | 62 |

This embodiment uses a table that differs from DMVR and has twice as much fractional positions. This improves the accuracy of the prediction.

In one embodiment, the sample bitdepth is 10, shift0=2, offset0=0, shift1=10, offset1=1<<9.

In one embodiment, the processing unit uses, as an input for the inter prediction of the sample value of the current full-integer pixel, the following entities:

a location (xCb, yCb) of the current block in full sample units two variables cbWidth and cbHeight specifying a width and a height of the current block a horizontal change of the motion vector, dX a vertical change of the motion vector, dY a motion vector, mvBaseScaled one or more selected reference picture sample arrays, refPicLX one or more sample bit depth, bitDepth a width of the frame in samples, pic_width a height of the frame in samples, pic_height an array obtained from (cbWidth)×(cbHeight), called (cb-Width)×(cbHeight) array predSamplesLX of prediction sample values.

It can further be provided that the variables A and B are obtained by $$A=(refPicLX[xInt][yInt]*T[xFrac][0]+refPicLX[xInt+1][yInt]*T[xFrac][1]+offset0)>>shift0$$

$$B=(refPicLX[xInt][yInt+1]*T[xFrac][0]+refPicLX[xInt+1][yInt+1]*T[xFrac][1]+offset0)>>shift0,$$

Wherein $$mvX[0]=(mvBaseScaled[0]+dX[0]*x+dY[0]*y)$$

$$mvX[1]=(mvBaseScaled[1]+dX[1]*x+dY[1]*y)$$

$$xInt=xCb+(mvX[0]>>9)+x$$

$$yInt=yCb+(mvX[1]>>9)+y$$

$$xFrac=(mvX[0]>>4)\&31$$

$$yFrac=(mvX[1]>>4)\&31$$

and wherein the locations xInt and yInt in the selected reference picture sample arrays, refPicLX[xInt][yInt], is given by $$xInt=Clip3(0,pic\_width-1,xInt)$$

$$yInt=Clip3(0,pic\_height-1,yInt).$$

In one embodiment, an encoding apparatus for encoding a current frame of a video signal is provided, wherein the encoding apparatus comprises an inter prediction apparatus according to any one of the above embodiments. This implements the above advantages for encoding for example video sequences.

In one embodiment, a decoding apparatus for decoding a current reconstructed frame of a compressed video signal is provided, wherein the decoding apparatus comprises an inter prediction apparatus according to any one the above embodiments. This implements the above advantages for decoding for example encoded video sequences.

In one embodiment, a computer program product comprising program code for performing the method of any one of the above embodiments when executed on a computer or a processor is provided.

In one embodiment, an encoder comprising processing circuitry for carrying out the method according to any one of the above embodiments is provided. Thereby, the advantages of the methods discussed above are also available for encoding for example video sequences.

In a further embodiment, a decoder comprising processing circuitry for carrying out the method according to any one of the above embodiments is provided. This implements the above advantages for decoding for example encoded video sequences.

In one embodiment, a computer program product comprising program code for performing the method according to any one of the above embodiments when executed on a computer or a processor is provided.

In one embodiment, a decoder is provided, the decoder comprising: one or more processors; and
a non-transitory computer-readable storage medium coupled to the processors and storing programming for execution by the processors, wherein the programming, when executed by the processors, configures the decoder to carry out the method according to any one of the above embodiments. This implements the above advantages for decoding for example encoded video sequences.

In one embodiment, an encoder is provided, the encoder comprising: one or more processors; and
a non-transitory computer-readable storage medium coupled to the processors and storing programming for execution by the processors, wherein the programming, when executed by the processors, configures the encoder to carry out the method according to any one of the above embodiments.

In one embodiment, a non-transitory computer-readable medium carrying a program code which, when executed by a computer device, causes the computer device to perform the method of any one of the above embodiments is provided.

In one embodiment, an apparatus for inter prediction of a sample value of a current full-integer pixel of a plurality of pixels of a current block of a current frame of a video signal is provided, wherein the apparatus comprises a processing unit configured to:
determine a motion vector of the current full-integer pixel on the basis of the current frame and a reference frame of the video signal and/or a motion compensation model;
determine for the current full-integer pixel a corresponding sub-integer pixel in the reference frame on the basis of the motion vector of the current full-integer pixel;
generate on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel;
determine a respective sample value of the corresponding sub-integer pixel of the current full-integer pixel and the corresponding filter support pixels in the reference frame; and
determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

This allows for efficiently predicting sample values of the current-full integer pixel.

In one embodiment, the predefined set of filter support pixels in the current frame comprises one or more vertically and/or horizontally neighboring half-integer pixels of the current full-integer pixel in the current frame. This increases the accuracy of the prediction.

It can be provided that the predefined set of filter support pixels in the current frame comprises one or more vertically and/or horizontally neighboring full-integer pixels of the current full-integer pixel in the current frame. This also further improves the prediction accuracy.

In one embodiment, the spatial high-pass filter is a 5-tap or a 3-tap filter. These efficiently contribute to the accuracy of the prediction.

In one embodiment, the predefined set of filter support pixels in the current frame comprises one or more neighboring full-integer pixels and half-integer pixels of the current full-integer pixel and wherein the 5-tap filter has the following filter coefficients (−6, 9, 26, 9, −6).

In one embodiment, the predefined set of filter support pixels in the current frame comprises one or more neighboring full-integer pixels and/or half-integer pixels of the current full-integer pixel and wherein the 5-tap filter has the filter coefficients (−1, 0, 10, 0, −1) or the 3-tap filter has the filter coefficients (−1, 10, −1).

It can also be provided that the processing unit of the apparatus is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame. This can further increase the prediction accuracy In one embodiment, the processing unit of the apparatus is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel.

It may further be provided that the processing unit of the apparatus is configured to determine a respective motion vector of each of the sub-integer pixels of the filter support pixels in the current frame by determining a mean vector of the motion vector of the current full-integer pixel and one or more motion vectors of neighboring full-integer pixels of the current full-integer pixel. Obtaining a mean vector and using this for further calculations can increase the computational efficiency of the prediction process.

In one embodiment, the processing unit of the apparatus is further configured to determine the one or more motion vectors of neighboring full-integer pixels of the current full-integer pixel on the basis of the current frame and the reference frame of the video signal and/or a motion compensation model.

It can be provided that the processing unit of the apparatus is configured to determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame, in case the motion vector of the current full-integer pixel is determined on the basis of a non-translational motion compensation model, and to determine the inter predicted sample value of the current pixel in the current frame on the basis of a conventional scheme, in case the motion vector of the current full-integer pixel is determined on the basis of a translational motion compensation model. These models may provide advantages in the prediction efficiency and/or accuracy.

In one embodiment, the non-translational motion compensation model is an affine, warping and/or panoramic motion compensation model.

In a further embodiment, the processing unit is configured to construct the set of separable 4-tap filters constructed as a convolution of a bilinear filter and a following high-pass filter.

Furthermore, it can be provided that the processing unit is configured to apply an intermediate rounding operation in the filtering process. Such rounding may comprise a right-shifting. This can reduce the computational complexity of the calculations.

In one embodiment, a method for inter prediction of a sample value of a current full-integer pixel of a plurality of pixels of a current block of a current frame of a video signal is provided, wherein the method comprises:

determining a motion vector of the current full-integer pixel on the basis of the current frame and a reference frame of the video signal and/or on the basis of a motion compensation model;

determining for the current full-integer pixel a corresponding sub-integer pixel in the reference frame on the basis of the motion vector of the current full-integer pixel;

generating on the basis of a predefined set of filter support pixels in the current frame a set of corresponding filter support pixels in the reference frame, wherein the predefined set of filter support pixels in the current frame comprises one or more neighboring full-integer and/or sub-integer pixels of the current full-integer pixel;

determining a respective sample value of the corresponding sub-integer pixel of the current full-integer pixel and the corresponding filter support pixels in the reference frame; and determining the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

Furthermore, in one embodiment, a method for inter prediction of a sample value of a current pixel of a plurality of pixels of a current block of a current frame of a video signal is provided, wherein the method comprises:

determining the inter predicted sample value of the current pixel in the current frame by applying a filter to the sample value L of the corresponding sub-integer pixel of the current full-integer pixel in the reference frame and to the sample values of the corresponding filter support pixels in the reference frame;

wherein sample value L of the corresponding sub-integer pixel of the current full-integer pixel in the reference frame is determined on the basis of one or more equations.

It can be provided that the filtering process is presented in terms of one or more of a shift, offset values and table T.

Furthermore, it may be provided that the sample value L of the corresponding sub-integer pixel of the current full-integer pixel in the reference frame is determined on the basis of the following equation:

$$A=(L0*T[fdX][0]+L1*T[fdX][1]+\text{offset0})>>\text{shift0}$$

$$B=(L2*T[fdX][0]+L3*T[fdX][1]+\text{offset0})>>\text{shift0}$$

$$L=(A*T[fdY][0]+B*T[fdY][1]+\text{offset1})>>\text{shift1}$$

Where table T is predefined table with size N×2 where N—number of fractional positions and values shift0, shift1, offset0, offset1 is derived based on sample bitdepth and table T. This can contribute to the prediction efficiency.

In one embodiment, the Table T comprise 16 fractional positions. This allows for reduced computational complexity in the calculations while also reducing the prediction accuracy.

In one embodiment, the Table T is defined as follows

| T[0] | T[1] |
|---|---|
| 64 | 0 |
| 60 | 4 |

-continued

| T[0] | T[1] |
|---|---|
| 56 | 8 |
| 52 | 12 |
| 48 | 16 |
| 44 | 20 |
| 40 | 24 |
| 36 | 28 |
| 32 | 32 |
| 28 | 36 |
| 24 | 40 |
| 20 | 44 |
| 16 | 48 |
| 12 | 52 |
| 8 | 56 |
| 4 | 60 |

It can be provided that L bitdepth is 10, shift0=2, offset0=0, shift1=10, offset1=1<<9.

In one embodiment, the Table T comprise 32 fractional positions. This increases the computational complexity but also increases the prediction accuracy. In an embodiment, the Table T may be defined as follows

| T[0] | T[1] |
|---|---|
| 64 | 0 |
| 62 | 2 |
| 60 | 4 |
| 58 | 6 |
| 56 | 8 |
| 54 | 10 |
| 52 | 12 |
| 50 | 14 |
| 48 | 16 |
| 46 | 18 |
| 44 | 20 |
| 42 | 22 |
| 40 | 24 |
| 38 | 26 |
| 36 | 28 |
| 34 | 30 |
| 32 | 32 |
| 30 | 34 |
| 28 | 36 |
| 26 | 38 |
| 24 | 40 |
| 22 | 42 |
| 20 | 44 |
| 18 | 46 |
| 16 | 48 |
| 14 | 50 |
| 12 | 52 |
| 10 | 54 |
| 8 | 56 |
| 6 | 58 |
| 4 | 60 |
| 2 | 62 |

In one embodiment, L bitdepth is 10, shift0=2, offset0=0, shift1=10, offset1=1<<9.

It can be provided that the filter is associated with bilinear interpolation, or wherein the filter corresponds to implementation of bilinear interpolation in DMVR in EVC (such as bilinear interpolation implementation as DMVR use). This makes reuse of modules or equations used in DMVR possible, reducing the memory required.

In one embodiment, an encoding apparatus for encoding a current frame of a video signal is provided, wherein the encoding apparatus comprises an inter prediction apparatus according to any one of the above embodiments. This implements the above advantages for encoding for example video sequences.

In one embodiment, a decoding apparatus for decoding a current reconstructed frame of a compressed video signal is provided, wherein the decoding apparatus comprises an inter prediction apparatus according to any one of the above embodiments. This implements the above advantages for decoding for example encoded video sequences. In a further embodiment, a computer program product comprising program code for performing the method of any one of the preceding embodiments when executed on a computer or a processor is provided.

Furthermore, an encoder comprising processing circuitry for carrying out the method according to any one of the above embodiments can be provided. This implements the above advantages for encoding for example video sequences.

In one embodiment, a decoder comprising processing circuitry for carrying out the method according to any one of the preceding embodiments is provided. This implements the above advantages for decoding for example encoded video sequences.

In one embodiment, a computer program product comprising program code for performing the method according to any one of the preceding embodiments when executed on a computer or a processor is provided.

In a further embodiment, a decoder is provided, the decoder comprising: one or more processors; and
 a non-transitory computer-readable storage medium coupled to the processors and storing programming for execution by the processors, wherein the programming, when executed by the processors, configures the decoder to carry out the method according to any one of the preceding embodiments. This implements the above advantages for decoding for example encoded video sequences.

In one embodiment, an encoder is provided, the encoder comprising: one or more processors; and
 a non-transitory computer-readable storage medium coupled to the processors and storing programming for execution by the processors, wherein the programming, when executed by the processors, configures the encoder to carry out the method according to any one of the preceding embodiments. This implements the above advantages for encoding for example video sequences.

In one embodiment, a non-transitory computer-readable medium carrying a program code which, when executed by a computer device, causes the computer device to perform the method of any one of the above embodiments is provided.

BRIEF DESCRIPTION OF THE DRAWINGS

Further embodiments of the application will be described with respect to the following figures, wherein:

FIG. 7 shows Table 1 indicating a set of separable 4-tap filters constructed as a convolution of a bilinear filter and a following high-pass filter;

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present application may be placed. It is understood that other aspects may be utilized and structural or logical changes may be made without departing from the scope of the present application. The following detailed description, therefore, is not to be taken in a limiting sense, as the scope of the present application is defined by the appended claims.

For instance, it is understood that a disclosure in connection with a described method may also hold true for a corresponding device or system configured to perform the method and vice versa. For example, if a method is described, a corresponding device may include a unit to perform the described method, even if such unit is not explicitly described or illustrated in the figures. Further, it is understood that the features of the various exemplary aspects described herein may be combined with each other, unless specifically noted otherwise.

Figure 1:
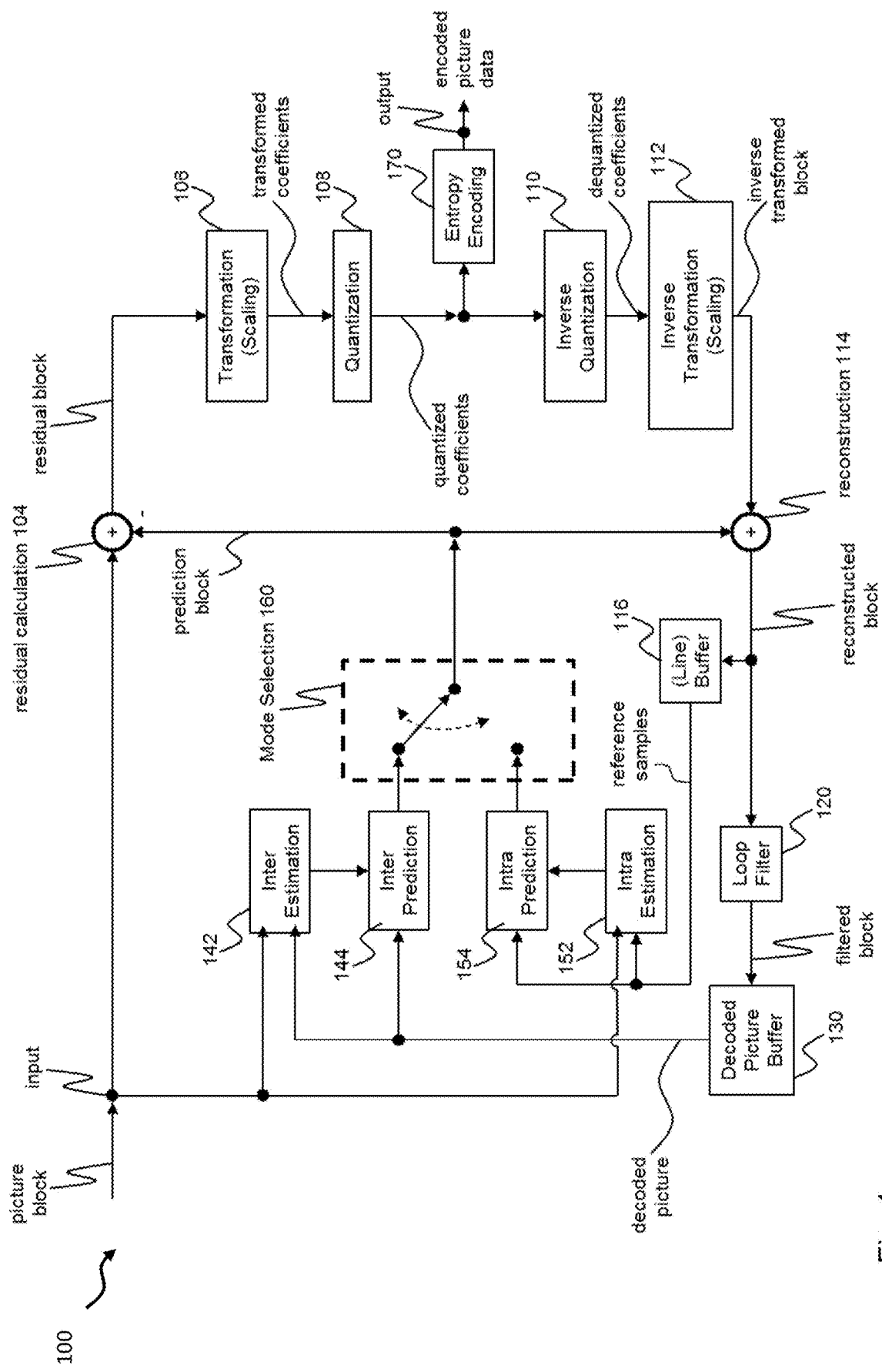
FIG. 1 shows a schematic diagram illustrating an encoding apparatus comprising an inter prediction apparatus according to an embodiment.

FIG. 1 shows an encoding apparatus 100 comprising an inter prediction apparatus 144 according to an embodiment. The encoding apparatus 100 may be configured to encode a block of a frame of a video signal comprising a plurality of frames (also referred to as pictures or images herein), wherein each frame may be dividable into a plurality of blocks and each block may comprise a plurality of pixels. The pixels may be any kind of information or may stand for any kind of information. The term "pixel" may not be understood to be limited to image points in a physical display. Rather, the term "pixel" is to be understood as having a meaning like "sample" without necessarily requiring any physical reality. While it is thus referred to pixels in the following, this term is to be construed as.

In an embodiment, the blocks could be macro blocks, coding tree units, coding units, prediction units and/or prediction blocks. These embodiments are, however, only examples and the blocks may be any blocks that could, for example, be used in video coding. Furthermore, the block may have any size and shape. In one embodiment, each block maybe provided as a matrix having a plurality of pixels (or samples) and having a size of M×N; M, N ∈ ℕ where M and N can, but are not necessarily of the same value.

In the embodiment shown in FIG. 1, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 2 further comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. Generally, the inter prediction unit 144 can be configured to perform motion compensation of a block based on motion estimation, as will be described in more detail further below. In an embodiment, the motion estimation can be performed by an inter estimation unit 142 of the encoding apparatus. However, in other embodiments, the functionality of the inter estimation unit 142 can be implemented as part of the inter prediction unit 144 as well.

Furthermore, in the hybrid encoder embodiment shown in FIG. 1 a residual calculation unit 104 determines the difference between the original block and its prediction, i.e. the residual block defining the prediction error of the intra/inter picture prediction. This residual block is transformed by the transformation unit 106 (for instance using a DCT) and the transformation coefficients are quantized by the quantization unit 108. The output of the quantization unit 108 as well as the coding or side information provided, for instance, by the inter prediction unit 144 are further encoded by an entropy encoding unit 170.

A hybrid video encoder, such as the encoding apparatus 100 shown in FIG. 1, usually duplicates the decoder processing such that both will generate the same predictions. Thus, in the embodiment shown in FIG. 1 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by an in-loop filter 120 for removing image artifacts. The final picture is stored in a decoded picture buffer 130 and can be used as a reference frame for the inter prediction of subsequent frames.

Figure 2:
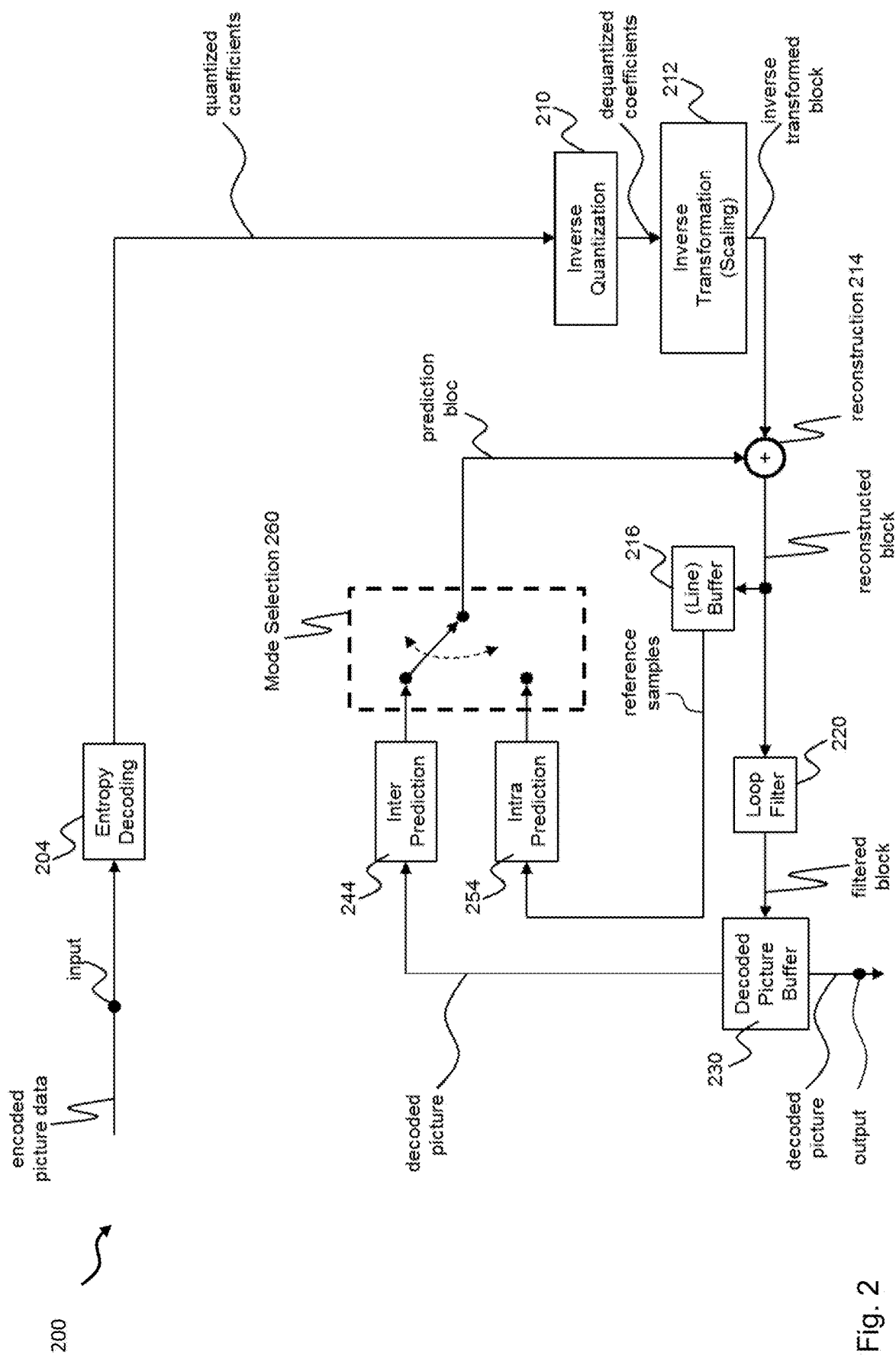
FIG. 2 shows a schematic diagram illustrating a decoding apparatus comprising an inter prediction apparatus according to an embodiment.
Figure 3:
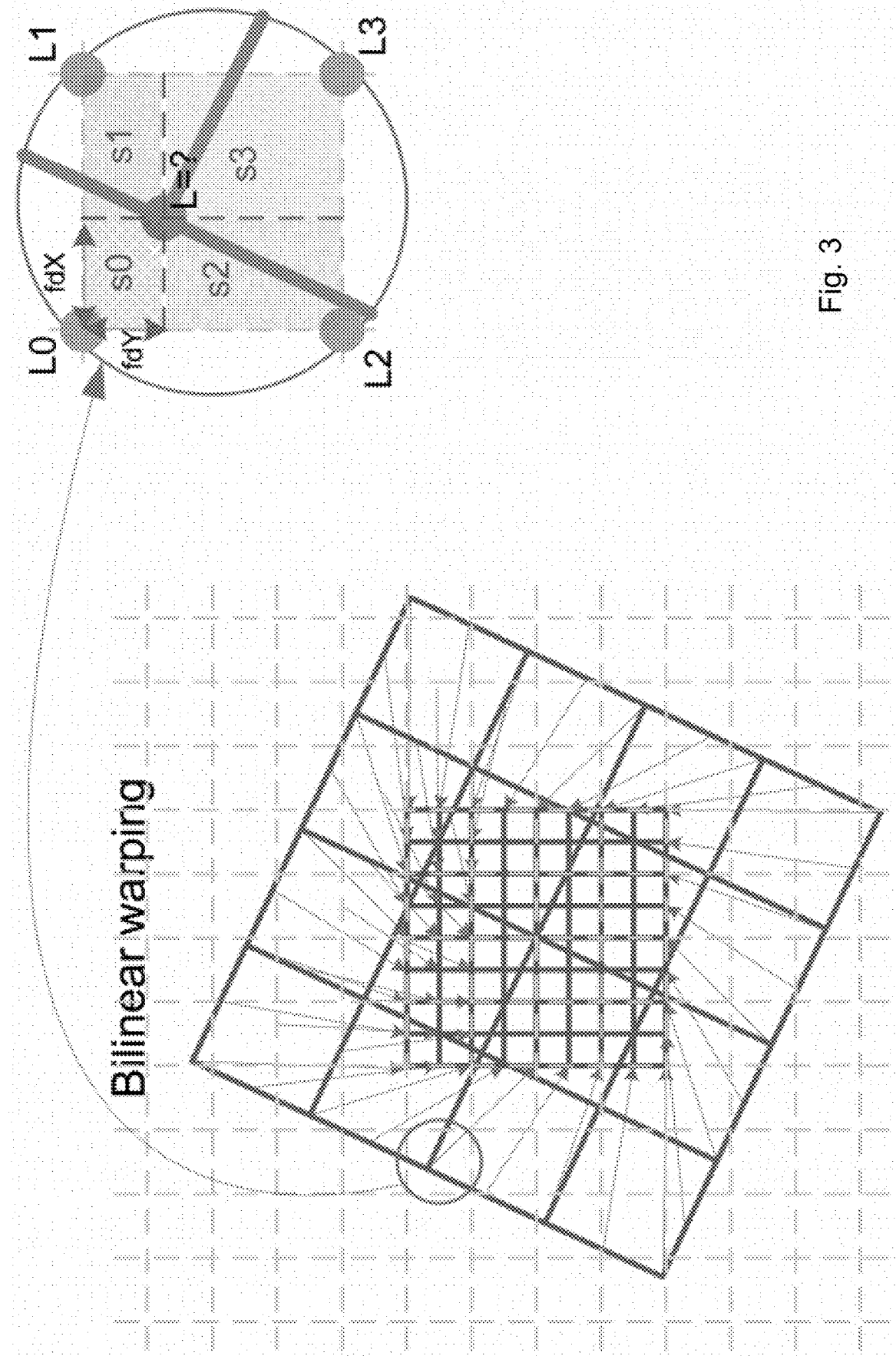
FIG. 3 shows a schematic diagram illustrating an aspect of an interpolation process implemented in an inter prediction apparatus according to an embodiment.

FIG. 2 shows a decoding apparatus 200 comprising an inter prediction apparatus 244 according to an embodiment. The decoding apparatus 200 is configured to decode a block of a frame of an encoded video signal. In the embodiment shown in FIG. 2 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for the inter prediction apparatus 244 and an intra prediction unit 254 as well as other components of the decoding apparatus 200. In the embodiment shown in FIG. 2, the inter prediction apparatus 244 or the intra prediction unit 254 of the decoding apparatus 200 shown in FIG. 3 are selected by a mode selection unit 260 and function in the same way as the inter prediction apparatus 144 and the intra prediction unit 154 of the encoding apparatus 100 shown in FIG. 1, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the in-loop filter 220 for future inter predictions.

As already described above, the apparatus 144, 244 is configured to perform an inter prediction of a sample value of a current full-integer pixel of a plurality of pixels associated with a current block of a current frame of a video signal. In this context, the respective current full-integer pixel is not necessarily part of the current block itself. It may also belong to a neighboring block. In an embodiment, if the current block represents a matrix with columns and rows ranging from x=0 . . . CbW−1 and y=0 . . . CbH−1 (where CbW is the width and CbH is the height of the current block and CbH, CbW∈ℕ), the current full integer-pixel "associated with" the current block may be at a position x=−1 and/or y=−1. Thus, though the current full-integer pixel is not in the inside of the current block, it may be part of a border region between the current block an immediately neighboring block. In this sense, although reference will be made below to the full-integer pixel "of" the current block, it is to be understood that this also encompasses that the full-integer pixel is "associated with" the current block as indicated above. For ease of discussion, however, there will not be provided a linguistic differentiation between these two cases below.

The apparatus 144, 244 comprises a processing unit, which can be implemented in software and/or hardware.

The processing unit of the apparatus 144, 244 is, in one embodiment configured to determine a motion vector of the current full-integer pixel. In an embodiment, the processing unit of the apparatus 144, 244 is configured to determine the motion vector of the current full-integer pixel on the basis of the current frame and a reference frame of the video signal by determining the position of the pixel in the reference frame corresponding to the current full-integer pixel in the current frame. In an embodiment, the processing unit of the apparatus 144, 244 is configured to determine the motion vector of the current full-integer pixel on the basis of an (adopted) motion compensation model. For instance, in the case of a translational or affine motion compensation model as a special case of a motion compensation model, the motion vector of the current full-integer pixel can be determined using one or more motion vectors of pixels of the same block the current full-integer pixel belongs to. As used herein, "motion compensation model" is also referred to as motion transformational model, motion model description and the like. Other motion compensation models, including warping and/or panoramic motion models, may understood under the term motion compensation model and the application is not limited in this regard to a specific motion compensation model unless otherwise indicated explicitly.

The processing unit of the apparatus 144, 244 is, in some embodiments, further configured to determine for the current full-integer pixel the corresponding sub-integer pixel in the reference frame on the basis of the motion vector of the current full-integer pixel.

The processing unit of the apparatus 144, 244 is further configured to generate on the basis of a predefined set of filter support pixels in the current frame a set of corresponding filter support pixels in the reference frame. The predefined set of filter support pixels in the current frame comprises one or more neighboring full-integer pixels and/or sub-integer pixels of the current full-integer pixel.

In an embodiment, the predefined set of filter support pixels in the current frame comprises one or more vertically and/or horizontally neighboring half-integer pixels of the current full-integer pixel in the current frame. For instance, in an embodiment the predefined set of filter support pixels in the current frame comprises the neighboring half-integer pixels above, to the left of, below and to the right of the current full-integer pixel.

In an embodiment, the predefined set of filter support pixels in the current frame comprises one or more vertically and/or horizontally neighboring full-integer pixels of the current full-integer pixel in the current frame. For instance, in an embodiment the predefined set of filter support pixels in the current frame comprises the neighboring full-integer pixels above, to the left of, below and to the right of the current full-integer pixel. In an embodiment, the predefined set of filter support pixels in the current frame can comprise the neighboring half-integer and full-integer pixels above, to the left of, below and to the right of the current full-integer pixel in the current frame.

The processing unit of the apparatus 144, 244 may be further configured to determine a respective sample value, in particular a luminance value of the corresponding sub-integer pixel of the current full-integer pixel and the corresponding filter support pixels in the reference frame.

In an embodiment, the processing unit of the apparatus 144, 244 may also be configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame. FIG. 3 illustrates an example of using bilinear interpolation for determining the sample value of the corresponding sub-integer pixel of the current full-integer pixel in the reference frame. In FIG. 3, a reference block in the reference frame is enlarged and rotated relative to a current block comprising an exemplary current pixel of the current frame. Moreover, FIG. 3 illustrated the increased resolution used for the filter support pixels.

As can be taken from the enlarged view in FIG. 3, in an embodiment the sample value L of the corresponding sub-integer pixel of the current full-integer pixel in the reference frame can be determined by the processing unit as follows. The corresponding sub-integer pixel of the current full-integer pixel may have the fractional position (fdX, fdY) in a corresponding cell of the sample grid of the reference frame. L0, L1, L2, L3 are the known sample values of the neighboring full-integer pixels in the reference frame (i.e. the full-integer pixels located at the corners of the corresponding cell of the sample grid of the reference frame in which the corresponding sub-integer pixel of the current full-integer pixel is located). On the basis of the fractional position (fdX, fdY) the respective areas of the rectangles corresponding to s0, s1, s2, s3 can be calculated as follows: s0=fdX*fdY, s1=(1−fdX)*fdY, s2=fdX*(1−fdY), s3=(1−fdX)*(1−fdY). Bilinear interpolation can be expressed using a 2-tap filter having the following horizontal coefficients (1−fdX, fdX) and the following vertical coefficients (1−fdY, fdY). On the basis of these weighting factors the sample value L of the corresponding sub-integer pixel of the current full-integer pixel in the reference frame can be determined on the basis of the following equation:

$L = L0*s3 + L1*s2 + L2*s1 + L3*s0$. As already mentioned above, the same bilinear interpolation can be used for determining the sample values for the corresponding filter support pixels in the reference frame.

In another example, sample value L of the corresponding sub-integer pixel of the current full-integer pixel in the reference frame can be determined on the basis of the following equation:

$$A = (L0*T[fdX][0] + L1*T[fdX][1] + \text{offset0}) >> \text{shift0}$$

$$B = (L2*T[fdX][0] + L3*T[fdX][1] + \text{offset0}) >> \text{shift0}$$

$$L = (A*T[fdY][0] + B*T[fdY][1] + \text{offset1}) >> \text{shift1}$$

In some embodiments, the table T used in the above equations is a predefined table with size N×2 where N is a number of fractional positions and the values shift0, shift1, offset0, offset1 in the above equations are derived, for example, based on a sample bitdepth and the table T. In one example Table T comprise 16 fractional positions (corresponding to the rows indicated below):

| T[0] | T[1] |
|------|------|
| 64   | 0    |
| 60   | 4    |
| 56   | 8    |
| 52   | 12   |
| 48   | 16   |
| 44   | 20   |
| 40   | 24   |
| 36   | 28   |
| 32   | 32   |
| 28   | 36   |
| 24   | 40   |
| 20   | 44   |
| 16   | 48   |
| 12   | 52   |
| 8    | 56   |
| 4    | 60   |

For the above example, the following values may be chosen: The sample bitdepth L may be 10, and the other values may be set as follows: shift0=2, offset0=0, shift1=10, offset1=1<<9.

This embodiments implements a specific form of bilinear interpolation. Such implementation of bilinear interpolation corresponds to implementation of bilinear interpolation in DMVR in EVC. In this sense, that the bilinear interpolation used here for determining the sample values L "corresponds" to DMVR is to be understood as meaning that at least equations are used that are either similar or in fact identical to the equations used in DMVR. This allows for reusing the modules already developed in DMVR also in a method of enhanced interpolation filters (EIF) as is currently explained. So, using such implementation in EIF provides additional benefit because of modules of DMVR are reused and no separate modules for the bilinear interpolation need to be provided. However, even though the used equations in EIF may be highly similar or even identical to those used in DMVR, it is not necessary that the input to these equations is identical for EIF and DMVR. Nevertheless, even though the input may differ, as long as the equations are similar or even identical, it will be considered that the bilinear interpolation "corresponds" to DMVR. Basically, in one embodiment, EIF may use the same bilinear interpolation as is used in DMVR and may, additionally, also use the same input (e.g., the table comprising the 16 fractional positions as mentioned above).

In another embodiment, although similar or identical equations are used, the input to the bilinear interpolation may not be identical to DMVR with respect to the table T. Table T may, in such an embodiment, comprise 32 fractional positions:

| T[0] | T[1] |
|------|------|
| 64   | 0    |
| 62   | 2    |
| 60   | 4    |
| 58   | 6    |
| 56   | 8    |
| 54   | 10   |
| 52   | 12   |
| 50   | 14   |
| 48   | 16   |
| 46   | 18   |
| 44   | 20   |
| 42   | 22   |
| 40   | 24   |
| 38   | 26   |
| 36   | 28   |
| 34   | 30   |
| 32   | 32   |
| 30   | 34   |
| 28   | 36   |
| 26   | 38   |
| 24   | 40   |
| 22   | 42   |
| 20   | 44   |
| 18   | 46   |
| 16   | 48   |
| 14   | 50   |
| 12   | 52   |
| 10   | 54   |
| 8    | 56   |
| 6    | 58   |
| 4    | 60   |
| 2    | 62   |

Here, a sample value L bitdepth may be chosen to be 10, shift0=2, offset0=0, shift1=10, offset1=1<<9.

This implementation of bilinear interpolation is also close to EVC DMVR bilinear interpolation. The difference is mainly in used table T. Using 32 phases (i.e. fractional positions) instead of 16 provides more precise interpolation. This may provide performance benefits for EIF in comparison with the example where table T consists or comprises no more than 16 fractional positions, as mentioned above.

A further example of usage of such bilinear interpolation implementation as a part of enhanced interpolation filter in MPEG5/EVC is described below.

| Specification of the interpolation filter coefficients T[ p ] for each 1/16 fractional sample position p | | |
|---|---|---|
| Fractional sample position p | interpolation filter coefficients | |
| | T[ p ][ 0 ] | T[ p ][ 1 ] |
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |

-continued

Specification of the interpolation filter coefficients T[ p ]
for each 1/16 fractional sample position p

| Fractional sample position p | interpolation filter coefficients | |
|---|---|---|
| | T[ p ][ 0 ] | T[ p ][ 1 ] |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |
| 28 | 8 | 56 |
| 29 | 6 | 58 |
| 30 | 4 | 60 |
| 31 | 2 | 62 |

Interpolation Process for the Enhanced Interpolation Filter

For the prediction of the sample values of the current full-integer sample, further input to the above equations and also equations mentioned below is necessary and this may comprise the following parameters or values:

a location (xCb, yCb) in full-sample units,
two variables cbWidth and cbHeight (referred to above as CbH and CbW) specifying the width and the height of the current coding block,
horizontal change of motion vector dX,
vertical change of motion vector dY,
motion vector mvBaseScaled,
the selected reference picture sample arrays refPicLX,
sample bit depth bitDepth
width of the picture in samples pic_width,
height of the picture in samples pic_height.
The output of interest in the method, i.e. predicted sample values, is an array of size (cbWidth)×(cbHeight) comprising values called "predSamplesLX" of prediction sample values for each of the full-integer pixels.

The variables shift1, shift2, shift3, offset1, offset2 and offset3 may be derived as follows:
shift0 is set equal to bitDepth−8, offset0 is equal to 0,
shift1 is set equal to 12−shift0, offset1 is equal to $2^{shift1-1}$
For x=−1 . . . cbWidth and y=−1 . . . cbHeight, the following applies:
The motion vector mvX is derived as follows:

$mvX[0]=(mvBaseScaled[0]+dX[0]*x+dY[0]*y)$ (8-728)

$mvX[1]=(mvBaseScaled[1]+dX[1]*x+dY[1]*y)$ (8-729)

The variables xInt, yInt, xFrac and yFrac can be derived as follows:

$xInt=xCb+(mvX[0]>>9)+x$ (8-730)

$yInt=yCb+(mvX[1]>>9)+y$ (8-731)

$xFrac=(mvX[0]>>4)\&31$ (8-732)

$yFrac=(mvX[1]>>4)\&31$ (8-733)

With the above equations 8-728 to 8-733, the motion vectors and the position of the corresponding sub-integer pixel in the reference frame can be obtained. The latter are provided by xFrac and yFrac.

The locations (xInt, yInt) (corresponding to full-integer pixels in the reference frame) inside the given array refPicLX may be derived as follows:

$xInt=Clip3(0,pic\_width-1,xInt)$ (8-734)

$yInt=Clip3(0,pic\_height-1,yInt)$ (8-735)

The variables A and B may, in some embodiments, be derived by applying bilinear interpolation as referred to above (e.g., bilinear interpolation corresponding to DMVR may be applied) as follows:

$A=(refPicLX[xInt][yInt]*T[xFrac][0]+refPicLX[xInt+1][yInt]*T[xFrac][1]+offset0)>>shift0$ $B=(refPicLX[xInt][yInt+1]*T[xFrac][0]+refPicLX[xInt+1][yInt+1]*T[xFrac][1]+offset0)>>shift0$ With these values A and B and the respective positions yFrac, the sample value $b_{x,y}$ corresponding to location (x, y) is derived as follows:

$b_{x,y}=(A*T[yFrac][0]+B*T[yFrac][1]+offset1)>>shift1$ (8-740)

The values bx,y constitute sample values of the corresponding sub-integer pixel in the reference frame.

The enhancement interpolation filter coefficients eF[ ] are specified as {−1, 10, −1}.

The values eF[ ] equals to {−1, 10, −1} constitute spatial high-pass filter coefficients. Other values may be used here as well and the application is not restricted to using these specific enhancement filter coefficients.

The variables shift2, shift3, offset2 and offset3 are derived as follows:
shift2 is set equal to max(bit_depth−11, 0), offset2 is equal to $2^{shift2-1}$,
shift3 is set equal to (6−max(bit_depth−11, 0)), offset3 is equal to $2^{shift3-1}$,
For x=0 . . . cbWidth−1 and y=−1 . . . cbHeight, the following applies:

$h_{x,y}=(eF[0]*b_{x-1,y}+eF[1]*b_{x,y}+eF[2]*b_{x+1,y}+offset2)>>shift2$ (8-741)

For x=0 . . . cbWidth−1 and y=0 . . . cbHeight−1, the following applies:

$predSamplesLX_L[x][y]=Clip3(0,(1<<bitDepth)-1,(eF[0]*h_{x,y-1}+eF[1]*h_{x,y}+eF[2]*h_{x,y+1}+offset3)>>shift3)$ (8-742)

The result of equation 8-741 and 8-742 then constitute the predicted sample value(s) for the respective current full-integer pixel associated with the current block.

The processing unit of the apparatus 144, 244 may be further configured to determine an inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

In an embodiment, the spatial high-pass filter is a 5-tap filter. In an embodiment, the 5-tap filter is a symmetric filter, i.e. a filter where the first and the fifth filter coefficients are identical and the second and the fourth filter coefficients are identical. In an embodiment, the first and the fifth filter coefficients are negative, while the other filter coefficients of the 5-tap filter are positive. In an embodiment, the spatial high-pass filter can be applied separately in the vertical and the horizontal direction. The application is, however, not limited in regards to which filter being used. Rather, any high-pass filter may be used as enhancement interpolation filter.

In an embodiment, the predefined set of filter support pixels in the current frame comprises five neighboring full-integer pixels and half-integer pixels of the current full-integer pixel and the 5-tap filter has the following filter coefficients (−6, 9, 26, 9, −6) within a given numerical precision, which can be normalized by the factor 1/32.

In a further embodiment, the predefined set of filter support pixels in the current frame comprises five neighboring full-integer pixels and half-integer pixels of the current full-integer pixel and the 5-tap filter has the following filter coefficients (−1, 0, 10, 0, −1) within a given numerical precision, which can be normalized by the factor 1/8. As will be appreciated, in an embodiment without the intermediate half-integer support pixels, this filter becomes a 3-tap filter with three full-integer support pixels and with the coefficients (−1, 10, −1).

In an embodiment, the processing unit of the apparatus 144, 244 is configured to determine the inter predicted sample value of the current pixel in the current frame on the basis of a two-dimensional separable convolution process on the basis of the filter support pixels. For instance, for the case of a 5-tap filter the processing unit of the apparatus 144, 244 is configured to apply the 5-tap filter to each horizontal and vertical line defined by the five horizontally and vertically neighbouring half-integer and full-integer pixels of the current pixel.

Figure 4:
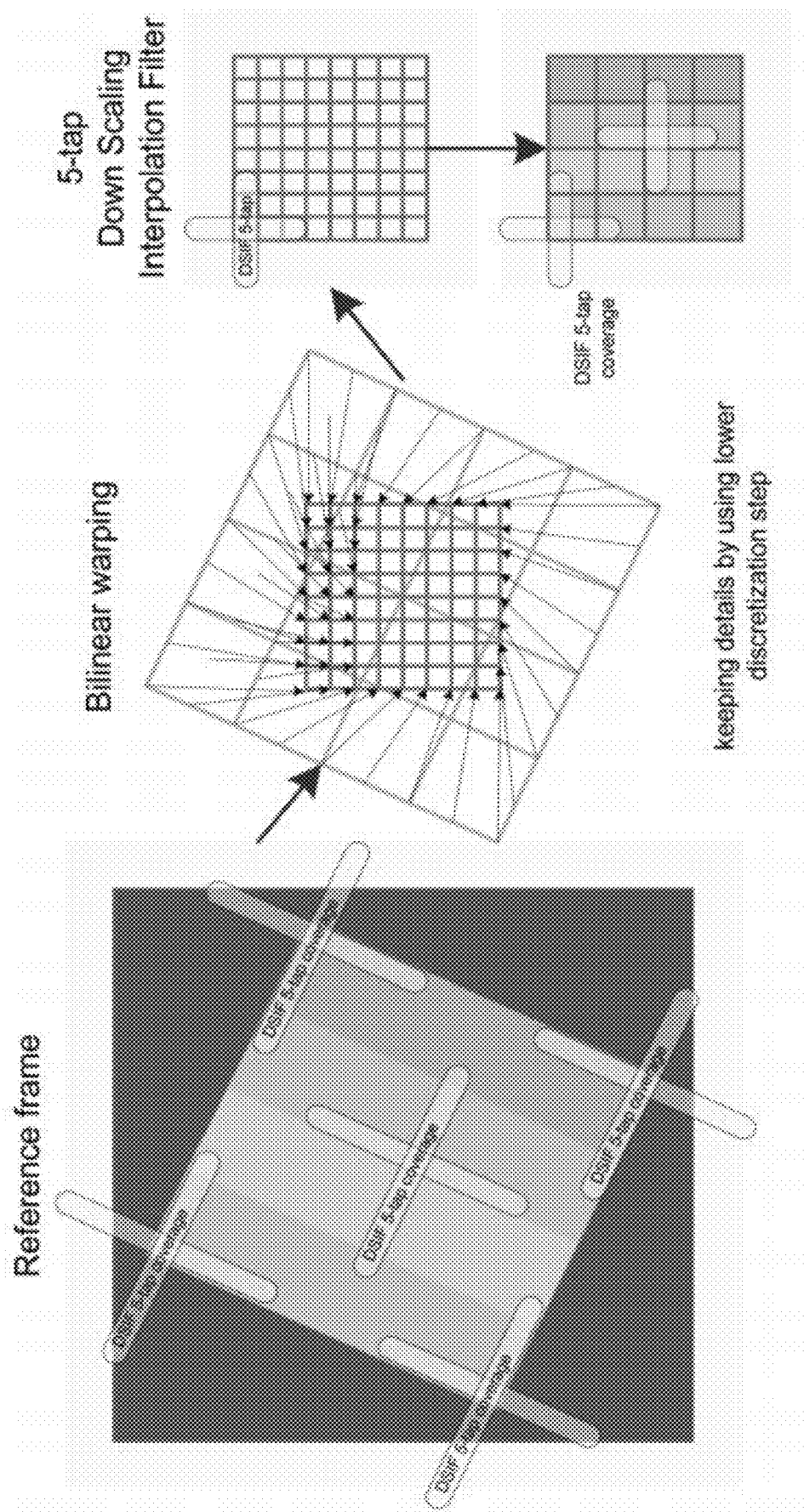
FIG. 4 shows a schematic diagram illustrating different aspects of an interpolation process implemented in an inter prediction apparatus according to an embodiment.

FIG. 4 illustrates different stages of the processing unit performed by the processing unit of the apparatus 144, 244 using a 5-tap filter in the vertical and the horizontal direction for the example shown in FIG. 3. As in the example shown in FIG. 3, the reference block is enlarged and rotated (corresponding to an affine transformation) relative to the current block, the 5-tap filters, which are vertical and horizontal in the current frame, are rotated in the reference frame.

In the following further embodiments of the inter prediction apparatus 144, 244, the encoding apparatus 100 and the decoding apparatus 200 will be described. In this context it will be understood that embodiments of the inter prediction apparatus 144, 244 relate to embodiments of the inter prediction apparatus 133 as implemented in the encoding apparatus 100 as well as embodiments of the inter prediction apparatus 244 as implemented in the decoding apparatus 200.

In an embodiment, the processing unit of the apparatus 144, 244 is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel. To this end, in an embodiment, the processing unit of the apparatus 144, 244 is configured to determine a mean vector of the motion vector of the current full-integer pixel and one or more motion vectors of neighboring full-integer pixels of the current full-integer pixel. For instance, for determining the motion vector of the half-integer pixel above the current full-integer pixel in the current frame the processing unit of the apparatus 144, 244 can compute the average, i.e. mean of the motion vector of the current full-integer pixel and the motion vector of the neighboring full-integer pixel above the current full-integer pixel.

Similar to the determination of the motion vector of the current pixel the processing unit of the apparatus 144, 244 can be configured to determine the one or more motion vectors of neighboring full-integer pixels of the current full-integer pixel on the basis of the current frame and the reference frame of the video signal and/or a motion compensation model.

In an embodiment, the processing unit of the apparatus 144, 244 is configured to determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame, in case the motion vector of the current full-integer pixel is determined on the basis of a non-translational motion compensation model, and to determine the inter predicted sample value of the current pixel in the current frame on the basis of a conventional scheme, such as the conventional scheme defined in H.264/AVC and H.265/HEVC, in case the motion vector of the current full-integer pixel is determined on the basis of a translational motion compensation model. In an embodiment, the non-translational motion compensation model is an affine, warping and/or panoramic motion compensation model.

In an another embodiment for translational motion compensation model the processing unit of the apparatus 144, 244 is configured to construct the set of separable 4-tap filters by convolving the proposed filters (i.e. the bilinear filter and the subsequent high-pass filter); for example, as follows: [f, 1−f]*[c0, c1, c2]=[(14)*(c0), f*(c0)+(1−f)*c1, f*(c1)+(1−f)*c2, f*(c2)], where f is a fractional offset of the motion vector in the horizontal or vertical direction, and [c0, c1, c2] are coefficients of the high-pass filter. The fractional position in this case may be discrete with a certain precision to obtain the finite table size. The final values of the coefficients may be multiplied by a norm factor and rounded so that the sum of coefficients for each offset equals the norm factor. In some embodiments, a filter with zero fractional offset may be equal to 1 (701) (no filtering for zero offset). For instance, having norm factor equal to 64 and fractional offset precision 1/32, the set of filter coefficients (700) may be the one shown in Table 1. This technique may be used, for example, for filtering chroma components. The technique may also be used for filtering of small blocks in order to keep worst case complexity and/or memory bandwidth low.

In some embodiments, the intermediate rounding or clipping at any step of implementation could be applied in order to keep the fixed number of bits as input range for computational operations. For instance, after any separable step of filtering (like horizontal filtering) intermediate values could be normalized and rounded to 16 bit of precision for using in the following multiplication by filter coefficient of the next step (like vertical filtering).

Figure 5:
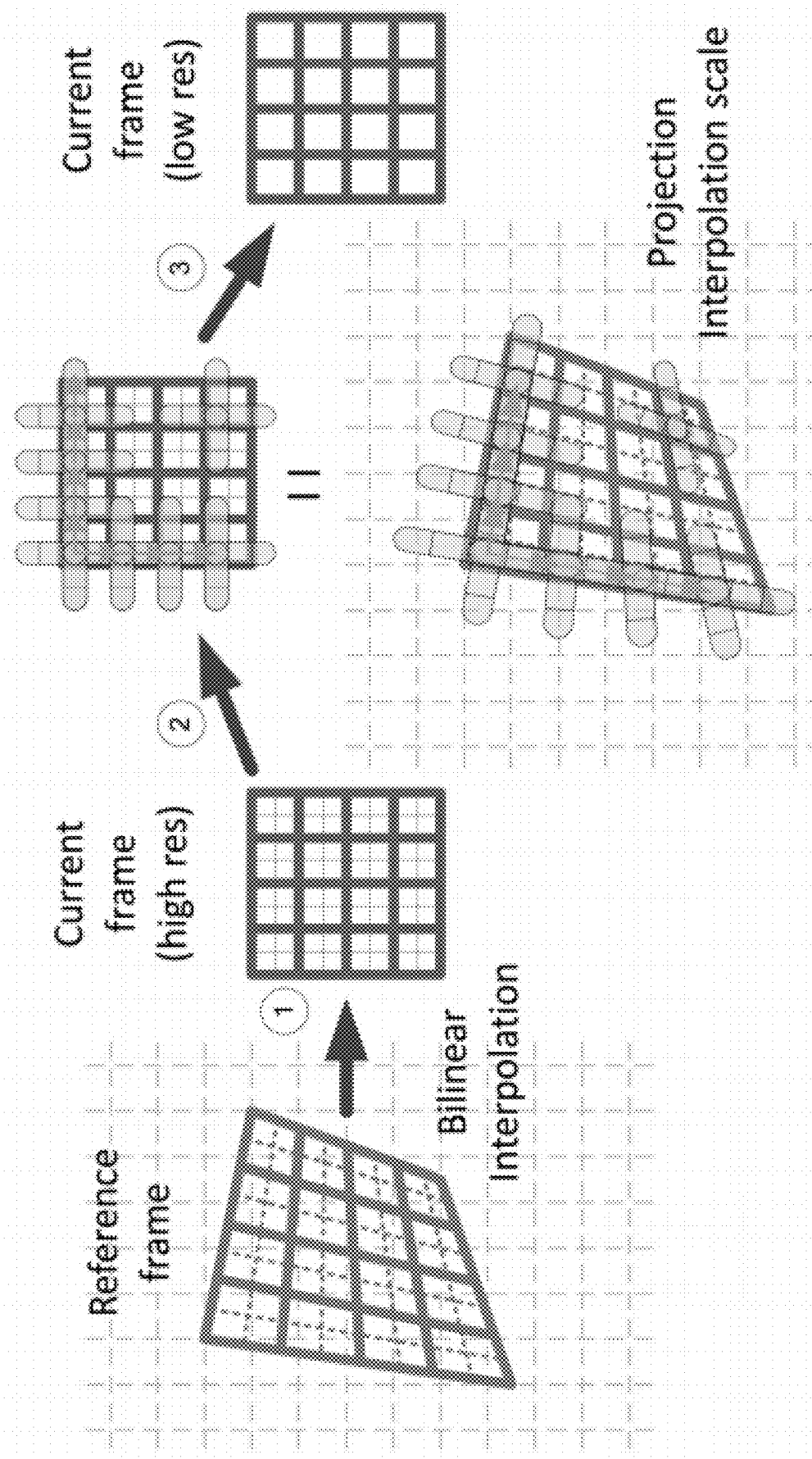
FIG. 5 shows a schematic diagram illustrating different aspects of an interpolation process implemented in an inter prediction apparatus according to an embodiment.

FIG. 5 summarizes several aspects of embodiments described above.

Figure 6:
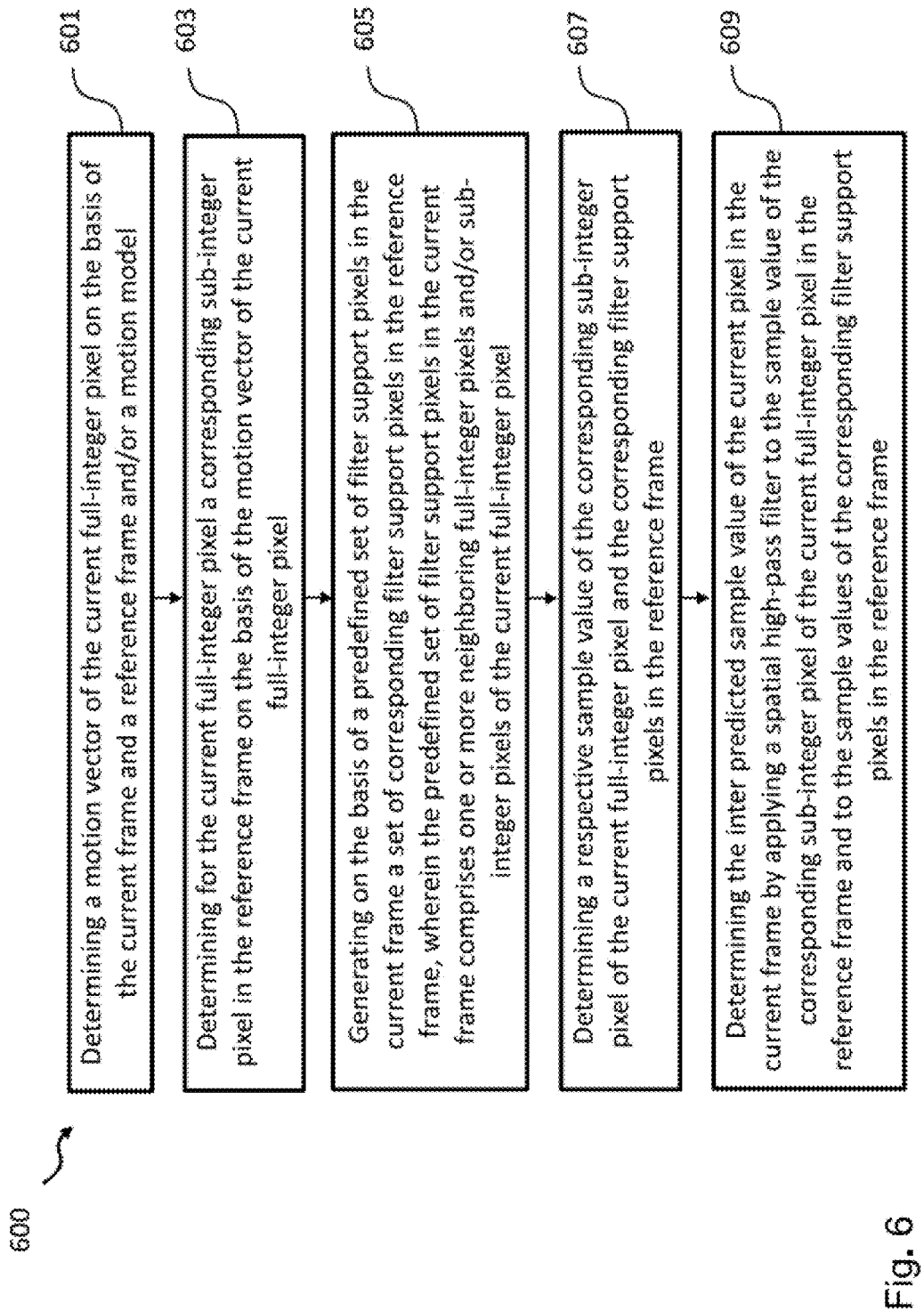
FIG. 6 shows a flow diagram illustrating operations of an inter prediction method according to an embodiment.

FIG. 6 shows a flow diagram illustrating a corresponding inter prediction method 600 according to an embodiment. The method 600 comprises the following: determining 601 a motion vector of the current full-integer pixel on the basis of the current frame and a reference frame of the video signal and/or on the basis of a motion compensation model; determining 603 for the current full-integer pixel a corresponding sub-integer pixel in the reference frame on the basis of the motion vector of the current full-integer pixel; generating 605 on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel; determining 607 a respective sample value of the corresponding sub-integer pixel of the current full-integer pixel and the corresponding filter support pixels in the reference frame; and determining 609 the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

Figure 8:
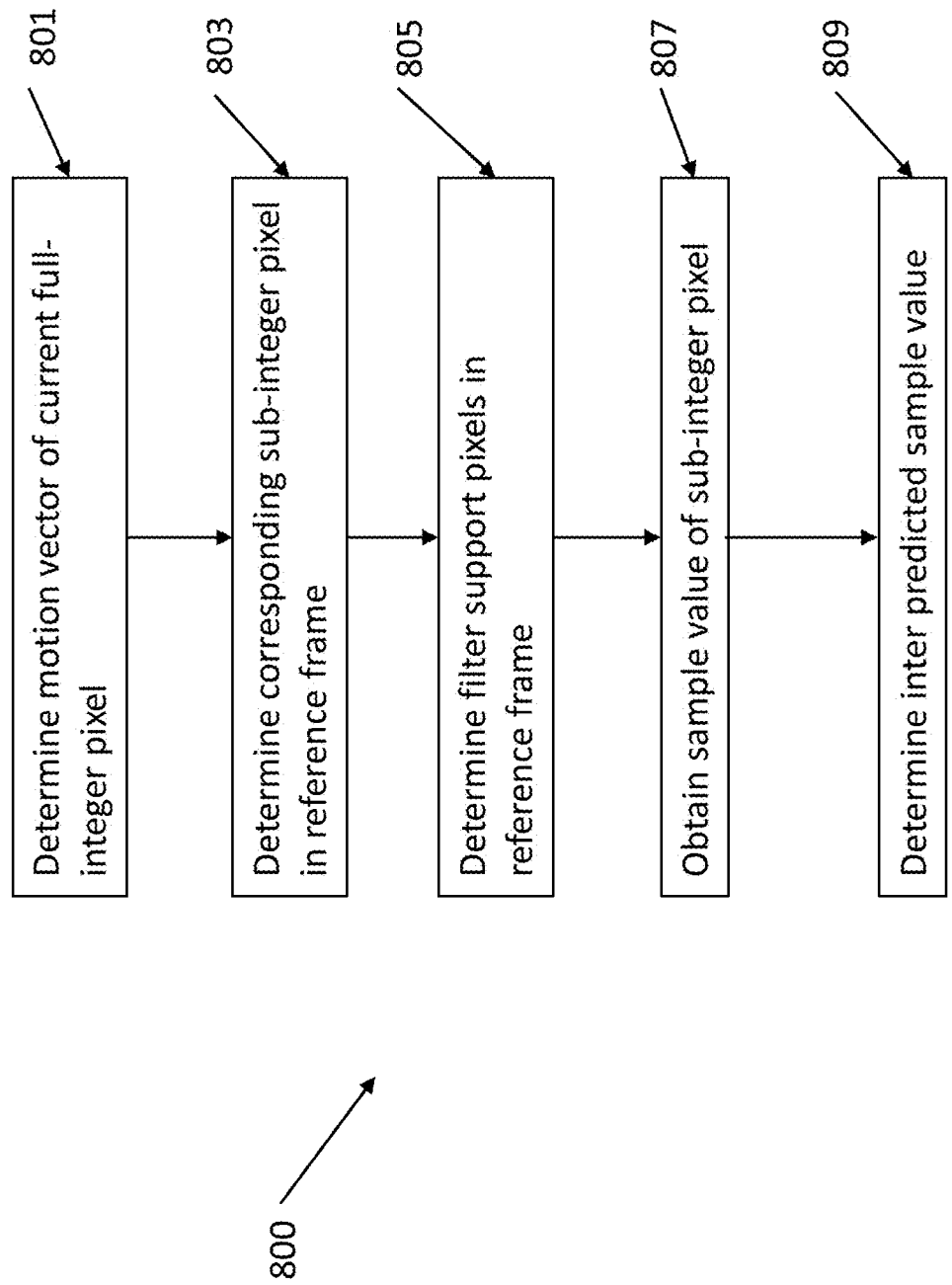
FIG. 8 shows a flow diagram of a method according to one embodiment.

FIG. 8 illustrates another embodiment of a method for inter prediction of a sample value of a current full-integer pixel of a plurality of pixels associated with a current block of a current frame of a video signal.

The method shown in FIG. 8 comprises a plurality of operations. However, the embodiment and the application made are not limited with respect to the number of operations performed. Also further operations may be performed that are currently not shown.

In the embodiment of FIG. 8, the method comprises:

Firstly, determining (801) a motion vector of the current full-integer pixel on the basis of a motion compensation model.

Subsequent to that, a corresponding sub-integer pixel in the reference frame on the basis of the motion vector of the current full-integer pixel is determined (803) for the current full-integer pixel.

It may be determined (805) on the basis of positions of a predefined set of filter support pixels in the current frame, positions of a set of corresponding filter support pixels in the reference frame, wherein the predefined set of filter support pixels in the current frame comprises one or more neighboring full-integer and/or sub-integer pixels of the current full-integer pixel.

From this, a respective sample value of the corresponding sub-integer pixel of the current full-integer pixel and the corresponding filter support pixels in the reference frame is obtained (807) by applying a bilinear interpolation. This interpolation may, as indicated previously, correspond to a bilinear interpolation in Decoder Side Motion Vector Refinement, DMVR. For example, DMVR as used in EVC may be used here.

After that, the inter predicted sample value of the current full-integer pixel is determined (809) by applying a spatial high-pass filter to the sample value of the corresponding sub-integer pixel of the current full-integer pixel in the reference frame and to the sample values of the corresponding filter support pixels in the reference frame.

Figure 9:
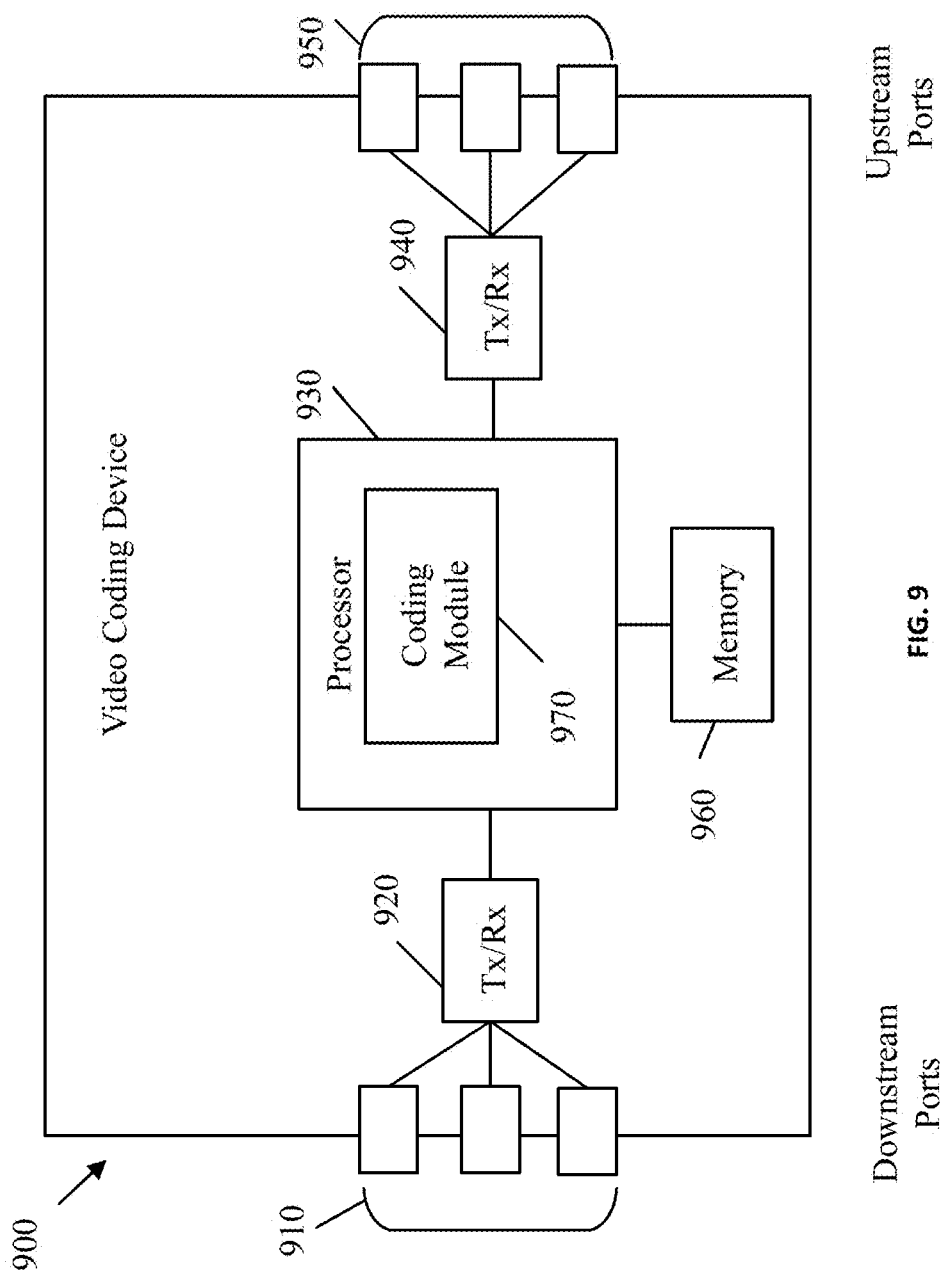
FIG. 9 is a block diagram illustrating an example of an encoding apparatus or a decoding apparatus.

FIG. 9 is a schematic diagram of a video coding device 900 according to an embodiment of the disclosure. The video coding device 900 is suitable for implementing the disclosed embodiments as described herein. In an embodiment, the video coding device 900 may be a decoder such as video decoder 200 of FIG. 2 or an encoder such as video encoder 100 of FIG. 1.

The video coding device 900 comprises ingress ports 910 (or input ports 910) and receiver units (Rx) 920 for receiving data; a processor, logic unit, or central processing unit (CPU) 930 to process the data; transmitter units (Tx) 940 and egress ports 950 (or output ports 950) for transmitting the data; and a memory 960 for storing the data. The video coding device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more CPU chips, cores (e.g., as a multi-core processor), FPGAs, ASICs, and DSPs. The processor 930 is in communication with the ingress ports 910, receiver units 920, transmitter units 940, egress ports 950, and memory 960. The processor 930 comprises a coding module 970. The coding module 970 implements the disclosed embodiments described above. For instance, the coding module 970 implements, processes, prepares, or provides the various coding operations. The inclusion of the coding module 970 therefore provides a substantial improvement to the functionality of the video coding device 900 and effects a transformation of the video coding device 900 to a different state. Alternatively, the coding module 970 is implemented as instructions stored in the memory 960 and executed by the processor 930.

The memory 960 may comprise one or more disks, tape drives, and solid-state drives and may be used as an overflow data storage device, to store programs when such programs are selected for execution, and to store instructions and data that are read during program execution. The memory 960 may be, for example, volatile and/or non-volatile and may be a read-only memory (ROM), random access memory (RAM), ternary content-addressable memory (TCAM), and/or static random-access memory (SRAM).

As shown in FIG. 9, an apparatus 900 may be adapted to perform a method in line with the embodiment of FIG. 8.

The apparatus 900 is configured to perform inter prediction of a sample value of a current full-integer pixel of a plurality of pixels associated with a current block of a current frame of a video signal, wherein the apparatus 900 comprises:

a memory 960 containing instructions; and
a processor 930 in communication with the memory and wherein the processor is configured to perform the following operations upon execution of the instructions:

determine a motion vector of the current full-integer pixel on the basis of a motion compensation model.

After that, the processor can determine for the current full-integer pixel a corresponding sub-integer pixel in the reference frame on the basis of the motion vector of the current full-integer pixel.

With this, the processor can determine, on the basis of positions of a predefined set of filter support pixels in the current frame, positions of a set of corresponding filter support pixels in the reference frame, wherein the predefined set of filter support pixels in the current frame comprises one or more neighbouring full-integer pixels and/or sub-integer pixels of the current full-integer pixel.

Based on that, the processor can obtain a respective sample value (L) of the corresponding sub-integer pixel of the current full-integer pixel and the corresponding filter support pixels in the reference frame by applying a bilinear interpolation. This bilinear interpolation may, as already discussed above, in some embodiments correspond to a bilinear interpolation in Decoder Side Motion Vector Refinement, DMVR. In an embodiment, the bilinear interpolation may be DMVR as used in EVC. Furthermore, the processor is adapted to determine the inter predicted sample value of the current full-integer pixel by applying a spatial high-pass filter to the sample value of the corresponding sub-integer pixel of the current full-integer pixel in the reference frame and to the sample values of the corresponding filter support pixels in the reference frame.

Figure 10:
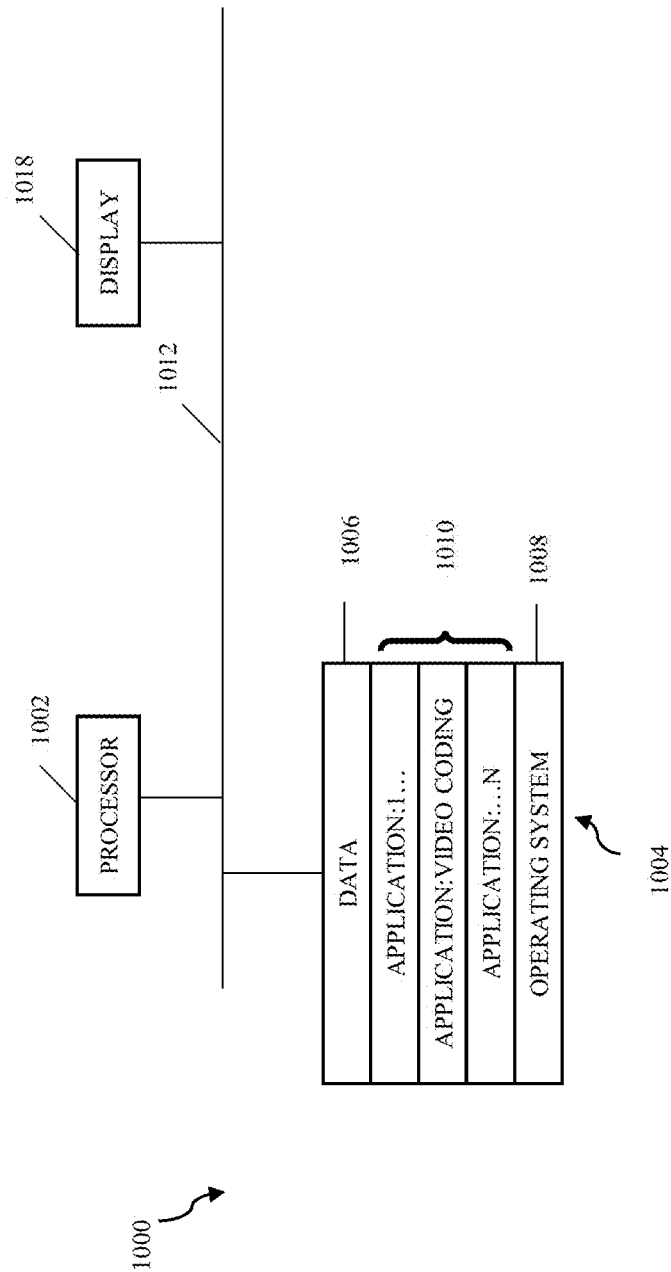
FIG. 10 is a block diagram illustrating another example of an encoding apparatus or a decoding apparatus.

FIG. 10 is a schematic diagram of a video coding device 1000 according to an embodiment of the disclosure. The video coding device 1000 is suitable for implementing the disclosed embodiments as described herein. In an embodiment, the video coding device 1000 may be a decoder such as video decoder 200 of FIG. 2 or an encoder such as video encoder 100 of FIG. 1.

A processor 1002 in the apparatus 1000 can be a central processing unit. Alternatively, the processor 1002 can be any other type of device, or multiple devices, capable of manipulating or processing information now-existing or hereafter developed. Although the disclosed implementations can be practiced with a single processor as shown, e.g., the processor 1002, advantages in speed and efficiency can be achieved using more than one processor.

A memory 1004 in the apparatus 1000 can be a read only memory (ROM) device or a random access memory (RAM) device in an implementation. Any other suitable type of storage device can be used as the memory 1004. The memory 1004 can include code and data 1006 that is accessed by the processor 1002 using a bus 1012. The memory 1004 can further include an operating system 1008 and application programs 1010, the application programs 1010 including at least one program that permits the processor 1002 to perform the methods described here. For example, the application programs 1010 can include applications 1 through N, which further include a video coding application that performs the methods described here.

The apparatus 1000 can also include one or more output devices, such as a display 1018. The display 1018 may be, in one example, a touch sensitive display that combines a display with a touch sensitive element that is operable to sense touch inputs. The display 1018 can be coupled to the processor 1002 via the bus 1012.

Although depicted here as a single bus, the bus 1012 of the apparatus 1000 can be composed of multiple buses. Further, the secondary storage 1014 can be directly coupled to the other components of the apparatus 1000 or can be accessed via a network and can comprise a single integrated unit such as a memory card or multiple units such as multiple memory cards. The apparatus 1000 can thus be implemented in a wide variety of configurations.

Figure 11:
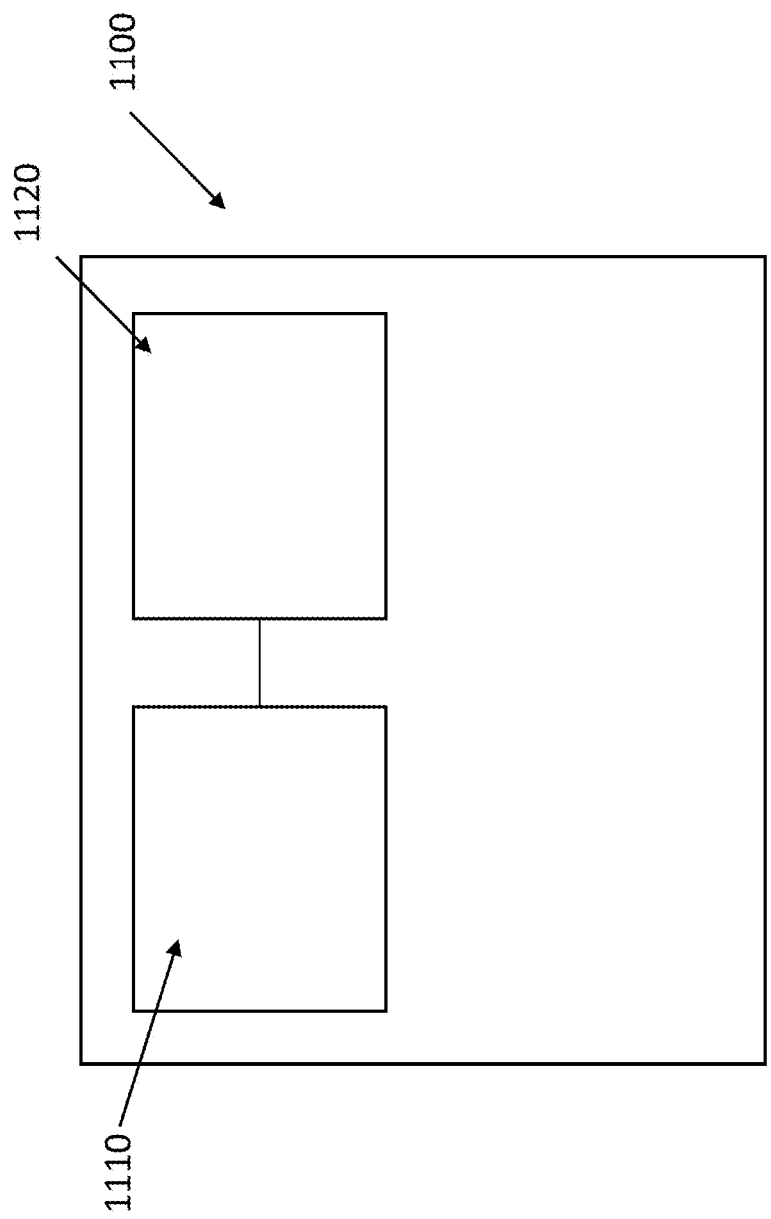
FIG. 11 shows an inter prediction apparatus according to one embodiment.

FIG. 11 shows a block diagram illustrating an example of an inter-prediction apparatus 1100 according to embodiments of the disclosure. In particular, FIG. 11 shows an inter-prediction apparatus (module) 1100. In an example, the inter-prediction apparatus 1100 may be implemented, for example as 142 and/or 144 in FIG. 1, or 244 in FIG. 2. The apparatus 1100 is an apparatus for inter prediction of a sample value of a current full-integer pixel of a plurality of pixels associated with a current block of a current frame of a video signal, wherein the apparatus includes a determining unit 1110 and an inter-prediction processing unit 1120.

The determining unit 1110 is configured to determine a motion vector of the current full-integer pixel on the basis of a motion compensation model; determine for the current full-integer pixel a corresponding sub-integer pixel in the reference frame on the basis of the motion vector of the current full-integer pixel; determine, on the basis of positions of a predefined set of filter support pixels in the current frame, positions of a set of corresponding filter support pixels in a reference frame, wherein the predefined set of filter support pixels in the current frame comprises one or more neighbouring full-integer pixels and/or sub-integer pixels of the current full-integer pixel.

The inter-prediction processing unit 1120 is configured to obtain a respective sample value (L) of the corresponding sub-integer pixel of the current full-integer pixel and the corresponding filter support pixels in the reference frame by applying a bilinear interpolation that corresponds to a bilinear interpolation in Decoder Side Motion Vector Refinement, DMVR; and determine the inter predicted sample value of the current full-integer pixel by applying a spatial high-pass filter to the sample value of the corresponding sub-integer pixel of the current full-integer pixel in the reference frame and to the sample values of the corresponding filter support pixels in the reference frame.

The method according to embodiments of FIG. 8 can be performed by the apparatus according to the embodiment of the application. Further features and implementation forms of the method according to the embodiments of the application correspond to the features and implementation forms of the apparatus according to the embodiment of the application.

The advantages of the methods according to embodiments are the same as those for the corresponding implementation forms of the apparatus according to the embodiment.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although aspects have been illustrated and described herein, it will be appreciated by those of ordinary skill in the art that a variety of alternate and/or equivalent implementations may be substituted for the aspects shown and described without departing from the scope of the present disclosure. This application is intended to cover any adaptations or variations of the aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as described herein.

Following is an explanation of the applications of the encoding method as well as the decoding method as shown in the above-mentioned embodiments, and a system using them.

Figure 12:
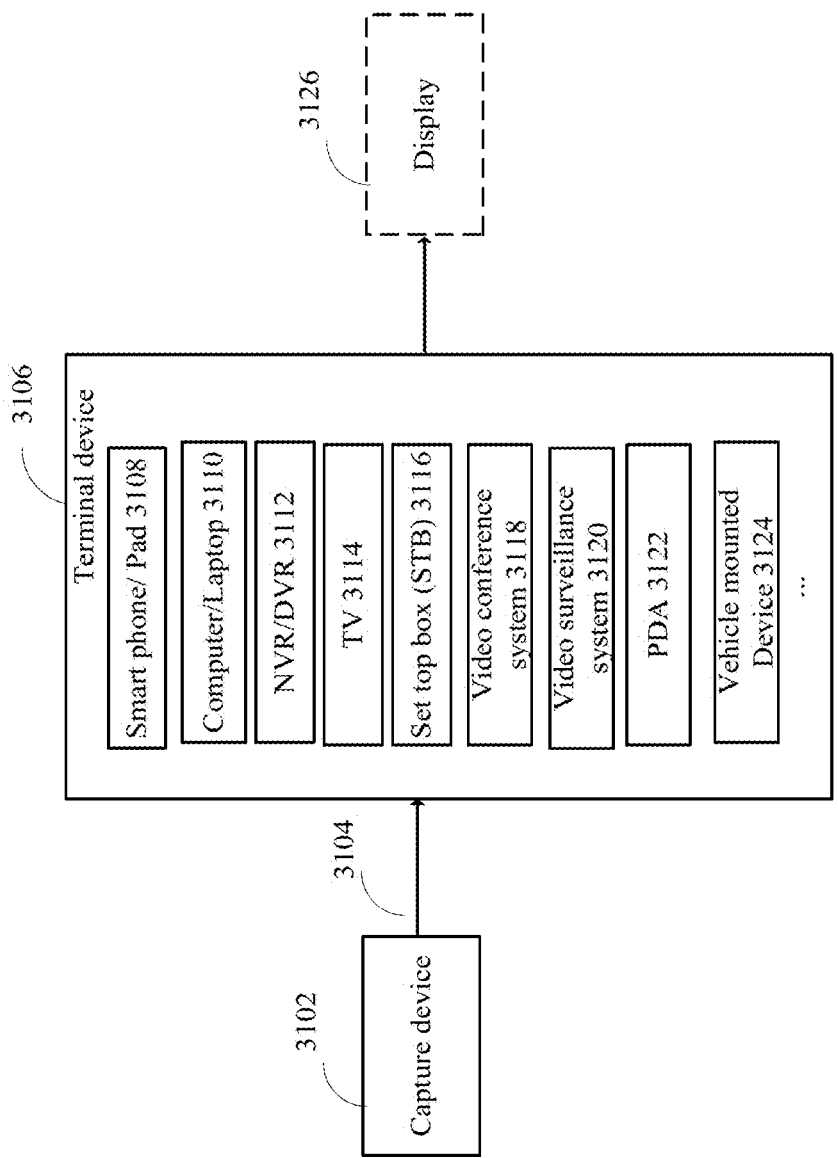
FIG. 12 is a block diagram showing an example structure of a content supply system 3100 which realizes a content delivery service.

FIG. 12 is a block diagram showing a content supply system 3100 for realizing content distribution service. This content supply system 3100 includes capture device 3102, terminal device 3106, and may include display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 13:
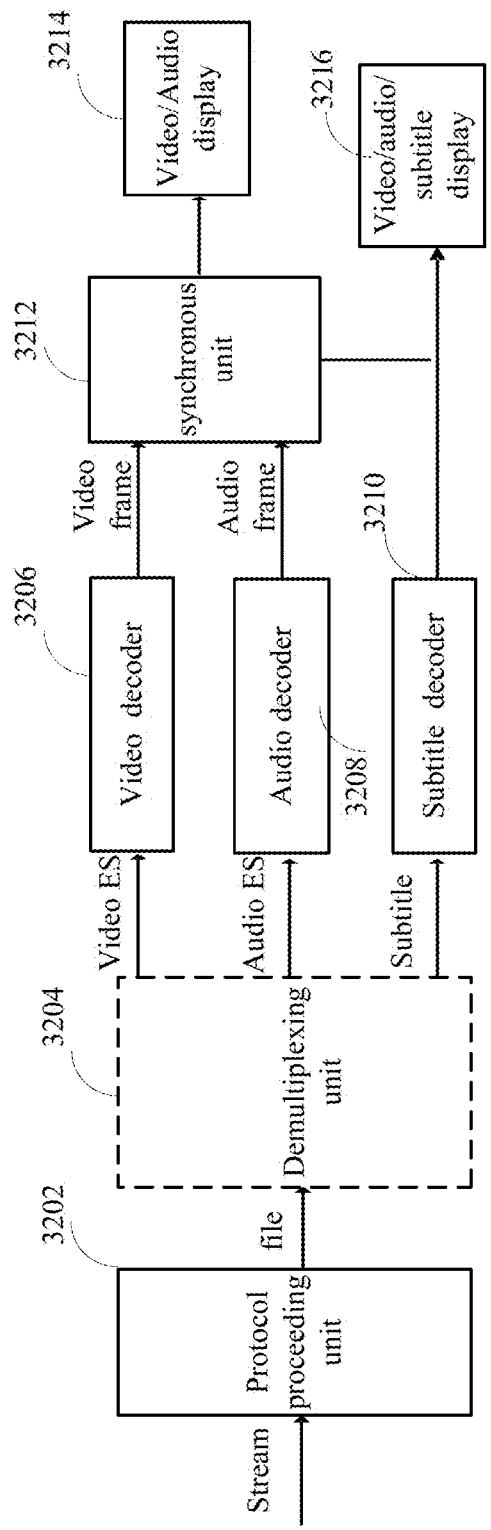
FIG. 13 is a block diagram showing a structure of an example of a terminal device.

FIG. 13 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and subtitle (which may be optional in some embodiments) are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present application is not limited to the above-mentioned system, and either the picture encoding device or the picture decoding device in the above-mentioned embodiments can be incorporated into other system, for example, a car system.

Though the description above makes use of the programming language C or provides programming code in C-language, this is, in at least some embodiments, not binding to the application. Indeed, embodiments of the application may be implemented using other programming language and/or other programming tools and/or other software modules than the ones described above and below.

In this sense, the use of C-language or C program code may, in some embodiments, be rather considered as pseudo-code, reflecting what, according to embodiments of the application, happens, but not restricting to the application of a specific programming code. Rather, embodiments may make use of the actual functions described above, independent from any implementation in program code and/or use of a programming language.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
\* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.
x % y Modulus. Remainder of x divided by y, defined only for integers x and y with x>=0 and y>0.

Logical Operators

The following logical operators are defined as follows:
x && y Boolean logical "and" of x and y
x||y Boolean logical "or" of x and y
! Boolean logical "not"
x?y : z If x is TRUE or not equal to 0, evaluates to the value of y; otherwise, evaluates to the value of z.

Relational Operators

The following relational operators are defined as follows:
\> Greater than
\>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
∧ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians
A tan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \text{ \&\& } y >= 0 \\ Atan\left(\frac{y}{x}\right) - \pi; & x < 0 \text{ \&\& } y < 0 \\ +\frac{\pi}{2}; & x == 0 \text{ \&\& } y >= 0 \\ -\frac{\pi}{2}; & \text{otherwise} \end{cases}$$

Ceil(x) the smallest integer greater than or equal to X.

$$Clip1_Y(x) = Clip3(0, (1 \ll BitDepth_Y) - 1, x)$$

$$Clip1_C(x) = Clip3(0, (1 \ll BitDepth_C) - 1, x)$$

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of X.

$$Min(x, y) = \begin{cases} x; & x <= y \\ y; & x > y \end{cases}$$

$$Max(x, y) = \begin{cases} x; & x >= y \\ y; & x < y \end{cases}$$

$$Round(x) = Sign(x) * Floor(Abs(x) + 0.5)$$

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

| operations (with operands x, y, and z) |
|---|
| "x++", "x− −" |
| "!x", "−x" (as a unary prefix operator) $x^y$ |
| "x ∗ y", "x / y", "x ÷ y", "$\frac{x}{y}$", "x % y" |
| "x + y", "x − y" (as a two-argument operator), "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \| \| y" |
| "x ? y : z" |
| "x . . . y" |
| "x = y", "x += y", "x −= y" |

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

. . . as follows/ . . . the following applies:

If condition 0, statement 0

Otherwise, if condition 1, statement 1

. . .

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
```

```
...
else
    statement n
``` may be described in the following manner:
   . . . as follows/ . . . the following applies:
   If all of the following conditions are true, statement 0:
      condition 0a
      condition 0b
   Otherwise, if one or more of the following conditions are true, statement 1:
      condition 1a
      condition 1b
   Otherwise, statement n In the text, a statement of logical operations as would be described mathematically in the following form:

```
if( condition 0 )
    statement 0
if( condition 1 )
    statement 1
``` may be described in the following manner:
   When condition 0, statement 0
   When condition 1, statement 1

Although embodiments of the application have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:
1. An apparatus, comprising:
a processor; and
a memory coupled to the processor to store instructions, which when executed by the processor, cause the apparatus to:
determine, based on a motion compensation model, a motion vector of a current full-integer pixel of a plurality of pixels associated with a current block of a current frame of a video signal;
determine for the current full-integer pixel a corresponding sub-integer pixel in a reference frame based on the motion vector of the current full-integer pixel;

determine, based on positions of a predefined set of filter support pixels in the current frame, positions of a set of corresponding filter support pixels in the reference frame, wherein the predefined set of filter support pixels in the current frame comprises one or more neighbouring full-integer pixels or sub-integer pixels of the current full-integer pixel;

obtain a respective sample value (L) of the corresponding sub-integer pixel of the current full-integer pixel and the corresponding filter support pixels in the reference frame by applying a bilinear interpolation that corresponds to a bilinear interpolation in Decoder Side Motion Vector Refinement (DMVR); and determine an inter predicted sample value of the current full-integer pixel by applying a spatial high-pass filter to the sample value of the corresponding sub-integer pixel of the current full-integer pixel in the reference frame and to sample values of the corresponding filter support pixels in the reference frame;

wherein the sample value of the corresponding sub-integer pixel of the current full-integer pixel in the reference frame is determined based on the following:

$A=(L0*T[fdX][0]+L1*T[fdX][1]+\text{offset0})\gg\text{shift0}$ $B=(L2*T[fdX][0]+L3*T[fdX][1]+\text{offset0})\gg\text{shift0}$ $L=(A*T[fdY][0]+B*T[fdY][1]+\text{offset1})\gg\text{shift1}$ wherein a table T is a predefined table with size N×2 wherein N is the number of fractional positions and shift0=bitDepth−8, offset0=0, shift1=12−shift0, offset1=1<<(shift1−1).

2. The apparatus according to claim 1, wherein the applied bilinear interpolation is the bilinear interpolation in DMVR.

3. The apparatus according to claim 1, wherein the table T has two columns T[0] and T[1] and T[1]=64−T[0] and the number of lines of the table T corresponds to a number of fractional sample positions.

4. The apparatus according to claim 3, wherein the table T comprises N=16 fractional sample positions and the table T is given by:

| Fractional position p | T[0] | T[1] |
|---|---|---|
| 0 | 64 | 0 |
| 1 | 60 | 4 |
| 2 | 56 | 8 |
| 3 | 52 | 12 |
| 4 | 48 | 16 |
| 5 | 44 | 20 |
| 6 | 40 | 24 |
| 7 | 36 | 28 |
| 8 | 32 | 32 |
| 9 | 28 | 36 |
| 10 | 24 | 40 |
| 11 | 20 | 44 |
| 12 | 16 | 48 |
| 13 | 12 | 52 |
| 14 | 8 | 56 |
| 15 | 4 | 60 |

5. The apparatus according to claim 3, wherein the table T comprises N=32 fractional sample positions and the table is given by:

| Fractional sample position p | interpolation filter coefficients T[ p ][ 0 ] | T[ p ][ 1 ] |
|---|---|---|
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |
| 28 | 8 | 56 |
| 29 | 6 | 58 |
| 30 | 4 | 60 |
| 31 | 2 | 62 |

6. The apparatus according to claim 1, wherein the instructions, which when executed by the processor, further cause the apparatus to use, as an input for inter prediction of the sample value of the current full-integer pixel, the following entities:

a location (xCb, yCb) of the current block in full sample units, a width (cbWidth) and a height (cbHeight) of the current block, a horizontal change of the motion vector (dY), a vertical change of the motion vector (dY), a motion vector (mvBaseScaled), one or more selected reference picture sample arrays (refPicLX), one or more sample bit depth (bitDepth), a width of the frame in samples (pic_width), a height of the frame in samples (pic_height), an array of size (cbWidth)×(cbHeight) comprising prediction sample values.

7. The apparatus according to claim 1, wherein the variables A and B are obtained by $A=(\text{refPicLX}[x\text{Int}][y\text{Int}]*T[x\text{Frac}][0]+\text{refPicLX}[x\text{Int}+1][y\text{Int}]*T[x\text{Frac}][1]+\text{offset0})\gg\text{shift0}$ $B=(\text{refPicLX}[x\text{Int}][y\text{Int}+1]*T[x\text{Frac}][0]+\text{refPicLX}[x\text{Int}+1][y\text{Int}+1]*T[x\text{Frac}][1]+\text{offset0})\gg\text{shift0},$ wherein $mvX[0]=(mvBaseScaled[0]+dX[0]*x+dY[0]*y)$ $mvX[1]=(mvBaseScaled[1]+dX[1]*x+dY[1]*y)$ $x\text{Int}=xCb+(mvX[0]\gg9)+x$ $y\text{Int}=yCb+(mvX[1]\gg9)+y$ xFrac=(mvX[0]>>4)&31 yFrac=(mvX[1]>>4)&31 and wherein the locations xInt and yInt in the selected reference picture sample arrays, refPicLX[xInt][yInt], is given by xInt=Clip3(0,pic_width−1,xInt)

yInt=Clip3(0,pic_height−1,yInt).

8. A method for inter prediction, comprising:
determining, based on a motion compensation model, a motion vector of a current full-integer pixel of a plurality of pixels associated with a current block of a current frame of a video signal;
determining for the current full-integer pixel a corresponding sub-integer pixel in a reference frame based on the motion vector of the current full-integer pixel;
determining, based on positions of a predefined set of filter support pixels in the current frame, positions of a set of corresponding filter support pixels in the reference frame, wherein the predefined set of filter support pixels in the current frame comprises one or more neighboring full-integer or sub-integer pixels of the current full-integer pixel;
obtaining a respective sample value of the corresponding sub-integer pixel of the current full-integer pixel and the corresponding filter support pixels in the reference frame by applying a bilinear interpolation that corresponds to a bilinear interpolation in Decoder Side Motion Vector Refinement (DMVR); and
determining an inter predicted sample value of the current full-integer pixel by applying a spatial high-pass filter to the sample value of the corresponding sub-integer pixel of the current full-integer pixel in the reference frame and to sample values of the corresponding filter support pixels in the reference frame;
wherein the sample value of the corresponding sub-integer pixel of the current full-integer pixel in the reference frame is determined based on the following:

A=(L0*T[fdX][0]+L1*T[fdX][1]+offset0)>>shift0

B=(L2*T[fdX][0]+L3*T[fdX][1]+offset0)>>shift0

L=(A*T[fdY][0]+B*T[fdY][1]+offset1)>>shift1 wherein a table T is a predefined table with size N×2 wherein N is the number of fractional positions and shift0=bitDepth−8, offset0=0, shift1=12−shift0, offset1=1<<(shift1−1).

9. The method according to claim 8, wherein the applied bilinear interpolation is the bilinear interpolation in DMVR.

10. The method according to claim 8, wherein the table T has two columns T[0] and T[1] and T[1]=64−T[0] and the number of lines of the table corresponds to a number of fractional sample positions.

11. The method according to claim 10, wherein the table T comprises N=16 fractional sample positions and the table T is given by:

| Fractional position p | T[0] | T[1] |
|---|---|---|
| 0 | 64 | 0 |
| 1 | 60 | 4 |
| 2 | 56 | 8 |
| 3 | 52 | 12 |
| 4 | 48 | 16 |
| 5 | 44 | 20 |
| 6 | 40 | 24 |
| 7 | 36 | 28 |
| 8 | 32 | 32 |
| 9 | 28 | 36 |
| 10 | 24 | 40 |
| 11 | 20 | 44 |
| 12 | 16 | 48 |
| 13 | 12 | 52 |
| 14 | 8 | 56 |
| 15 | 4 | 60 |

12. The method according to claim 10, wherein the table T comprises N=32 fractional sample positions and the table is given by:

| Fractional sample position p | interpolation filter coefficients T[ p ][ 0 ] | T[ p ][ 1 ] |
|---|---|---|
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |
| 28 | 8 | 56 |
| 29 | 6 | 58 |
| 30 | 4 | 60 |
| 31 | 2 | 62 |

13. The method according to claim 8, wherein the variables A and B are obtained by A=(refPicLX[xInt][yInt]*T[xFrac][0]+refPicLX[xInt+1][yInt]*T[xFrac][1]+offset0)>>shift0

B=(refPicLX[xInt][yInt+1]*T[xFrac][0]+refPicLX[xInt+1][yInt+1]*T[xFrac][1]+offset0)>>shift0, wherein mvX[0]=(mvBaseScaled[0]+dX[0]*x+dY[0]*y)

mvX[1]=(mvBaseScaled[1]+dX[1]*x+dY[1]*y)

xInt=xCb+(mvX[0]>>9)+x $y\text{Int} = yCb + (mvX[1] >> 9) + y$ $x\text{Frac} = (mvX[0] >> 4) \& 31$ $y\text{Frac} = (mvX[1] >> 4) \& 31$ and wherein the locations xInt and yInt in the selected reference picture sample arrays, refPicLX[xInt][yInt], is given by $x\text{Int} = \text{Clip3}(0, pic\_width - 1, x\text{Int})$ $y\text{Int} = \text{Clip3}(0, pic\_height - 1, y\text{Int})$.

14. A decoder, comprising:
one or more processors; and
a non-transitory computer-readable storage medium coupled to the one or more processors and storing programming, which when executed by the one or more processors, cause the decoder to perform the method according to claim 8.

15. An encoder, comprising:
one or more processors; and
a non-transitory computer-readable storage medium coupled to the one or more processors and storing programming, which when executed by the one or more processors, cause the encoder to perform the method according to claim 8.

* * * * *